(12) United States Patent
Aoki et al.

(10) Patent No.: US 11,909,747 B2
(45) Date of Patent: Feb. 20, 2024

(54) NETWORK PACKET ANALYZER AND COMPUTER PROGRAM PRODUCT

(71) Applicant: KABUSHIKI KAISHA TOSHIBA, Tokyo (JP)

(72) Inventors: Satoshi Aoki, Kawasaki Kanagawa (JP); Yoshikazu Hanatani, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 493 days.

(21) Appl. No.: 17/185,941

(22) Filed: Feb. 25, 2021

(65) Prior Publication Data

US 2022/0021689 A1 Jan. 20, 2022

(30) Foreign Application Priority Data

Jul. 15, 2020 (JP) .................. 2020-121253

(51) Int. Cl.
*H04L 9/40* (2022.01)
*G06N 5/04* (2023.01)
*G06N 20/00* (2019.01)

(52) U.S. Cl.
CPC .......... *H04L 63/1416* (2013.01); *G06N 5/04* (2013.01); *G06N 20/00* (2019.01)

(58) Field of Classification Search
CPC ...... G06N 20/00; G06N 5/04; H04L 63/1416; H04L 63/1425
See application file for complete search history.

(56) References Cited

U.S. PATENT DOCUMENTS

| | | | |
|---|---|---|---|
| 7,802,009 | B2 | 9/2010 | Cui et al. |
| 8,897,151 | B2 | 11/2014 | Liu et al. |
| 9,100,326 | B1 | 8/2015 | Iliofotou et al. |
| 9,473,380 | B1 | 10/2016 | Bermudez et al. |

(Continued)

FOREIGN PATENT DOCUMENTS

| | | | |
|---|---|---|---|
| JP | 4149137 B2 | 9/2008 | |
| JP | 6501999 B2 | 4/2019 | |

(Continued)

OTHER PUBLICATIONS

Bermudez et al., "Automatic Protocol Field Inference for Deeper Protocol Understanding," IFIP, 9 pages (2015).

(Continued)

*Primary Examiner* — Olugbenga O Idowu
(74) *Attorney, Agent, or Firm* — Finnegan, Henderson, Farabow, Garrett & Dunner, LLP

(57) ABSTRACT

A network packet analyzer according an embodiment includes a memory and one or more hardware processors. The memory stores a plurality of sets of training data in which semantics of one protocol field and one or more patterns indicating characteristics of variations of the parameters of the one protocol field are associated with each other. The hardware processors: captures a network packets and extracts a variable field whose parameter varies in time series; generates, based on the parameter varying in the time series in the variable field, one or more patterns indicating a characteristic of a variation of the parameter; and compares each of the one or more patterns with each of the one or more patterns of the training data and estimate the semantics of the variable field.

12 Claims, 18 Drawing Sheets

(56) References Cited

U.S. PATENT DOCUMENTS

| | | |
|---|---|---|
| 10,715,570 B1 * | 7/2020 | Feinstein ............... H04L 65/61 |
| 2019/0296935 A1 | 9/2019 | Hong et al. |
| 2019/0349390 A1 | 11/2019 | Kito et al. |
| 2021/0178995 A1 | 6/2021 | Koyama et al. |
| 2021/0203444 A1 | 7/2021 | Koyama et al. |

FOREIGN PATENT DOCUMENTS

| | | |
|---|---|---|
| WO | WO 2019/102911 A1 | 5/2019 |
| WO | WO 2019/107149 A1 | 6/2019 |

OTHER PUBLICATIONS

Choi et al., "Dissecting Customized Protocols: Automatic Analysis for Customized Protocols based on IEEE 802.15.4," ACM WiSec '16, pp. 183-193 (2016).

Cui et al., "*Discoverer*: Automatic Protocol Reverse Engineering from Network Traces," 16$^{th}$ USENIX Security Symposium, pp. 199-212 (2007).

Kleber et al., "Poster: Network Message Field Type Recognition," CCS '19, (Nov. 11-15, 2019, London, United Kingdom), pp. 2581-2583 (2019).

Ládi et al., "Message Format and Field Semantics Inference for Binary Protocols Using Recorded Network Traffic," 26th International Conference on Software, Telecommunications and Computer Networks (SoftCOM), 6 pages (2018).

Wang et al., "Biprominer: Automatic Mining of Binary Protocol Features," IEEE Computer Soc. 12$^{th}$ Int'l Conf. on Parallel and Distributed Computing, Applications and Techs., pp. 179-184 (2011).

\* cited by examiner

FIG.7

| SET | CHANGE PATTERN TYPE 1 | CHANGE PATTERN TYPE 2 | SEMANTICS OF PROTOCOL FIELD |
|---|---|---|---|
| FIRST SET | TRIANGULAR WAVE | TWO | ON/OFF OPERATION VALUE |
| SECOND SET | TRAPEZOIDAL WAVE | (UPPER LIMIT VALUE − LOWER LIMIT VALUE + 1) | PROCESS VARIABLE |
| ⋮ | ⋮ | ⋮ | ⋮ |
| Nth SET | xxx | xxx | xxx |

FIG.12

| VARIABLE PORTION | | SEMANTICS | TOTAL SIMILARITY MEASURE |
|---|---|---|---|
| IDENTI-FIER | SUBFIELD | | |
| 4000xa | FIRST SUBFIELD | ON/OFF OPERATION VALUE | R11 |
| 4000xc | THIRD SUBFIELD | CONTINUOUS CONTROL VALUE | R22 |
| ... | ... | ... | ... |

700b

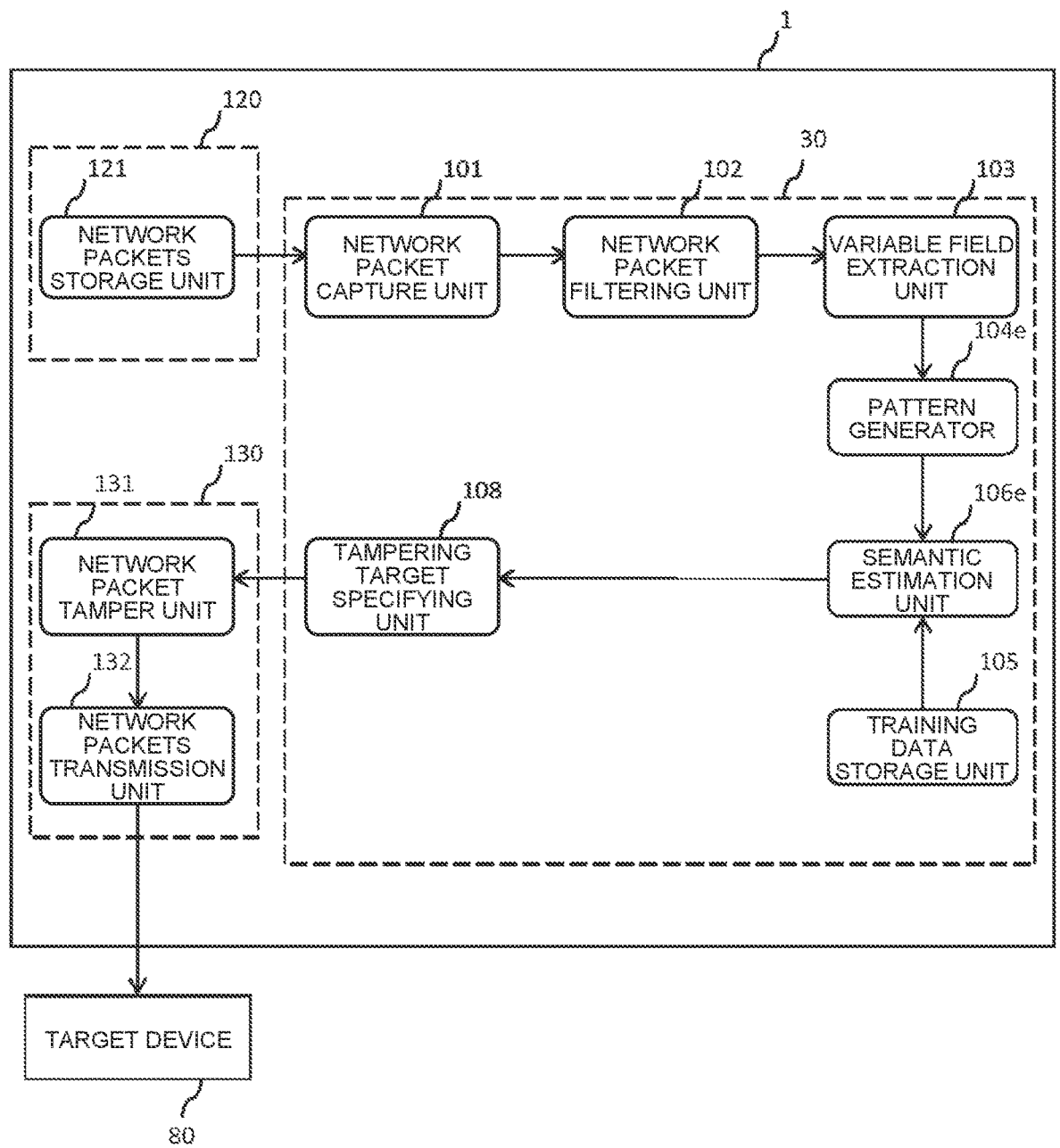

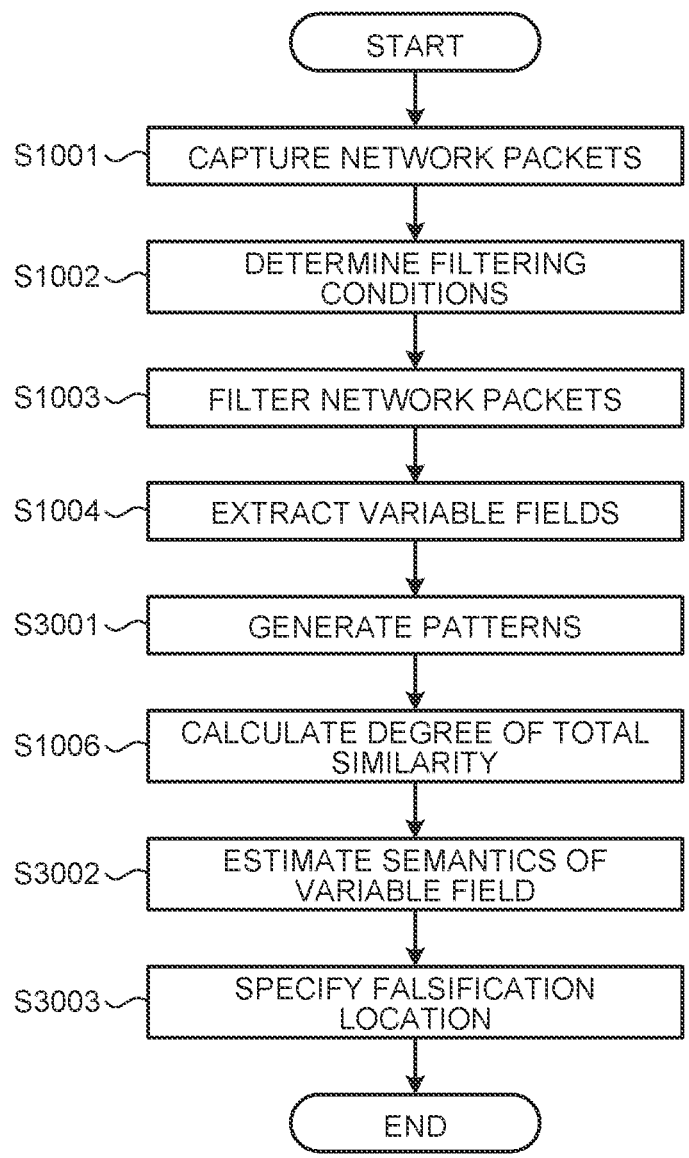

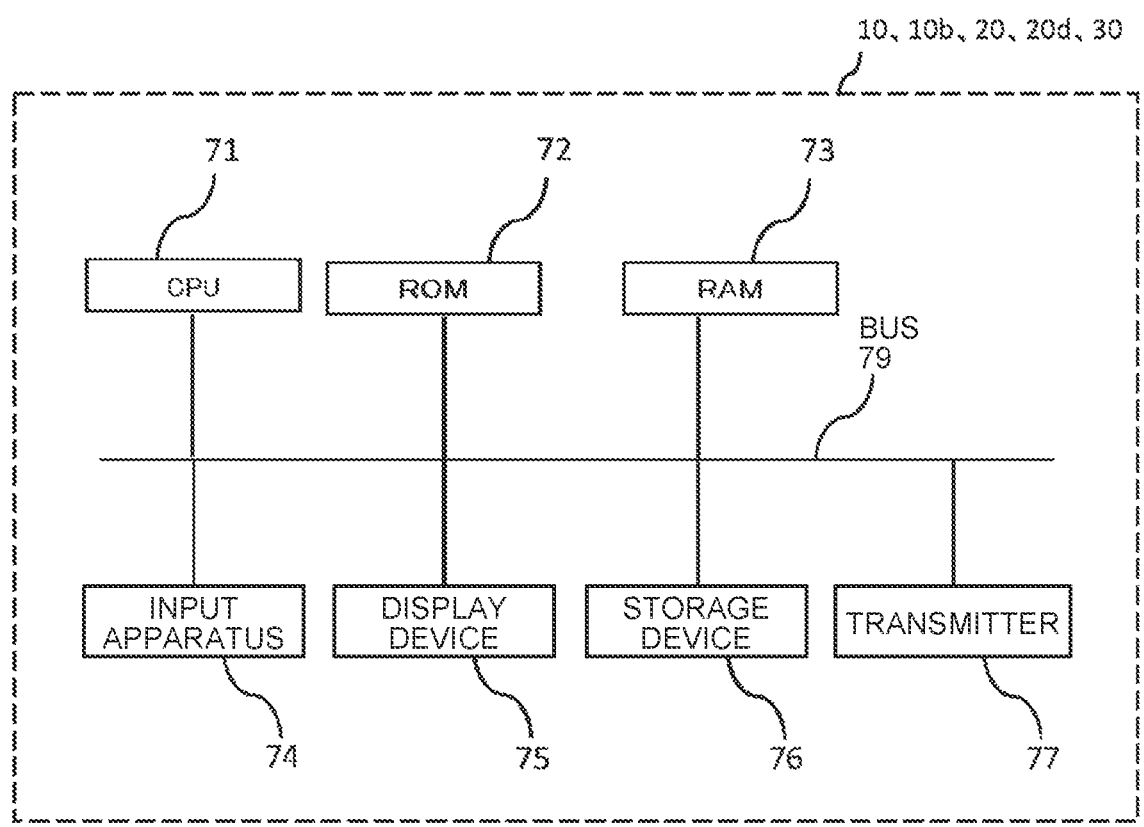

NETWORK PACKET ANALYZER AND COMPUTER PROGRAM PRODUCT

CROSS-REFERENCE TO RELATED APPLICATIONS

This application is based upon and claims the benefit of priority from Japanese Patent Application No. 2020-121253, filed on Jul. 15, 2020; the entire contents of which are incorporated herein by reference.

FIELD

Embodiments described herein relate generally to a network packet analyzer and a computer program product.

BACKGROUND

Cyber attacks on control systems include an attack that analyzes a protocol structure peculiar to control devices and tampers values (parameters) of the protocol fields of network packets to cause illegal operations. In order to conduct an evaluation test for a cyber attack on the control system, it is necessary to develop a technology that emulates the cyber attack.

In order to make a cyber attack a success, there is a need to use appropriate tampering in consideration of the semantics of the protocol field. Therefore, in developing a technique for emulating a cyber attack on a control system, there has been a demand for a technique for estimating the semantics of a protocol field.

Typically, an analysis of communication protocols uses a protocol analyzer utilizing protocol specifications. Here, the protocol specification defines the protocol fields (range, delimiter, and semantics) of network packets. The application layer protocol used in the control system often uses a proprietary protocol unique to the application, and thus, there might be cases where it is difficult to obtain the protocol specification or even there are no documented protocol specifications.

Meanwhile, there is a method referred to as automatic protocol reverse engineering that estimates a protocol structure by using network packets without using protocol specifications.

Some conventional technique automatic protocol reverse engineering methods can specify the semantics of a protocol field by creating an algorithm for each of the semantics of specific protocol fields. However, the conventional method lacks scalability in that there is a need to prepare an algorithm individually and it is difficult to estimate the semantics of other protocol fields for which no algorithm has been created.

Therefore, there is a need for appropriately estimating the semantics of a field in network packets.

BRIEF DESCRIPTION OF THE DRAWINGS

FIG. 7 is an example of training data;
FIG. 12 is an example of estimation result information;
FIG. 16 is a functional block diagram of the inspection system according to the third embodiment;
FIG. 17 is an example of a processing procedure of a network packet analyzer according to the third embodiment;
and
FIG. 18 is a hardware configuration diagram of the network packet analyzer of an embodiment.

DETAILED DESCRIPTION

A network packet analyzer according an embodiment includes a memory and one or more hardware processors. The memory is configured to store a plurality of sets of training data in which semantics of one protocol field and one or more patterns indicating characteristics of variations of the parameters of the one protocol field are associated with each other. The hardware processors are configured to: capture a network packets and extract a variable field whose parameter varies in time series; generate, based on the parameter varying in the time series in the variable field, one or more patterns indicating a characteristic of a variation of the parameter; and compare each of the one or more patterns with each of the one or more patterns of the training data and estimate the semantics of the variable field.

Hereinafter, embodiments for carrying out the disclosure will be described.

First Embodiment

Outline and configuration of first embodiment A first embodiment will be described with reference to FIGS. 1 to 9.

Figure 1:
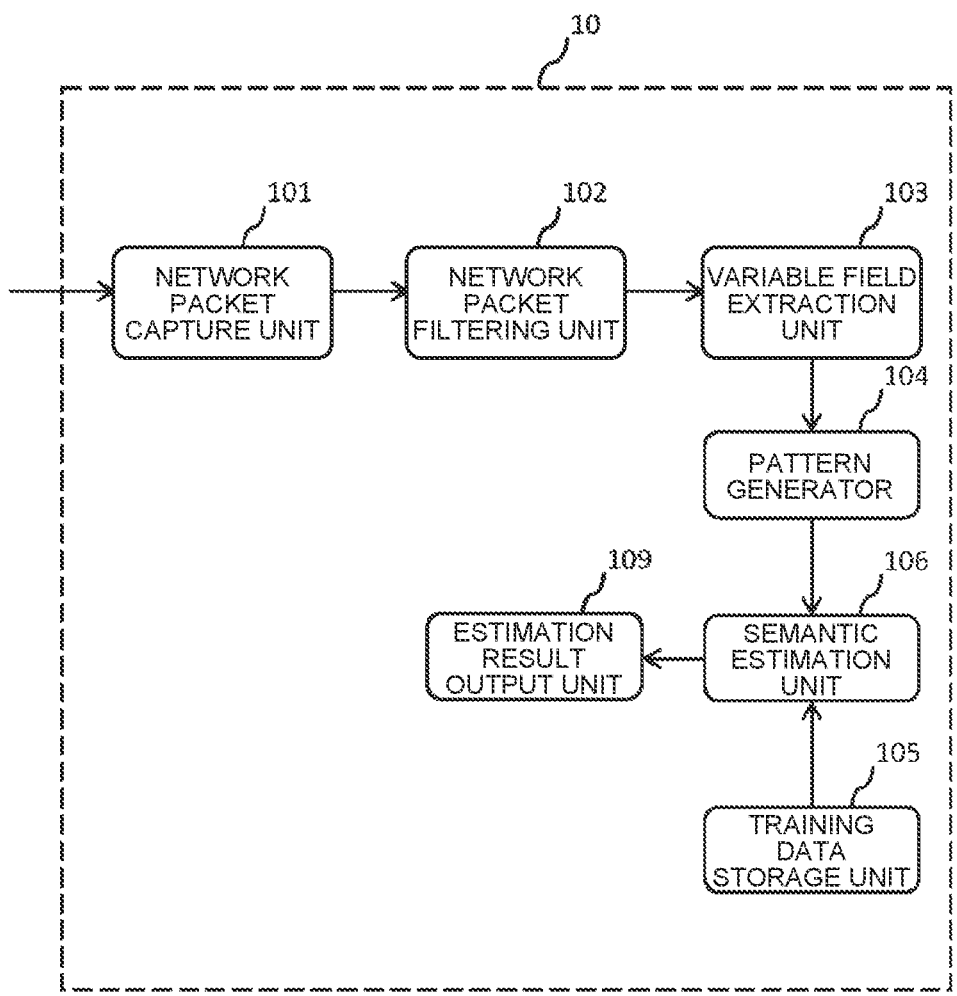
FIG. 1 is a functional block diagram of a network packet analyzer according to a first embodiment.

FIG. 1 is a functional block diagram illustrating a functional configuration of a network packet analyzer 10 according to the first embodiment. As illustrated in FIG. 1, the network packet analyzer 10 includes a network packets capture unit 101, a network packet filtering unit 102, a variable field extraction unit 103, a pattern generator 104, a training data storage unit 105, a semantic estimation unit 106, and an estimation result output unit 109.

The network packet analyzer 10 estimates the semantics of an unknown protocol field contained in the network packets exchanged in a target system. In the present specification, a protocol field is a range (field) designated based on the specifications defined for each of protocols of network packets. That is, network packets has a plurality of protocol fields. In a case where the specification of the protocol used for communication is unknown, the protocol field of the protocol is unknown.

Furthermore, in the present specification, the "semantics of the protocol field" indicates the purpose for which the protocol field of the network packets is used.

Examples of the semantics of the protocol field include a time stamp, an address, a control command type (a type indicating Read command or Write command, or the like), a data length, a sequence number, a counter, a checksum, a set point (set temperature, or the like), process variables (temperature sensor values, etc.), ON/OFF operation values, and state flags.

In general, some communication protocol specifications are public and some are not. For example, in communications used in a control system, the application layer protocol can be a protocol whose specifications have not been published in some cases. The semantics of a protocol field are not determined by a simple protocol specification, but are also influenced by how the protocol field is used in an application (for example, not only simply storing a register value but also related to whether the protocol field is used as a set temperature value or for the temperature sensor value, etc.).

Each of the protocol fields stores parameters. The parameter is assumed to be a hex dump. Each of the parameters stored in a protocol field has a specific value representing the semantics of the protocol field.

For example, when the semantics of the protocol field is a temperature setting value, the parameter stored in this protocol field indicates a specific numerical value of the temperature set value.

Figure 2:
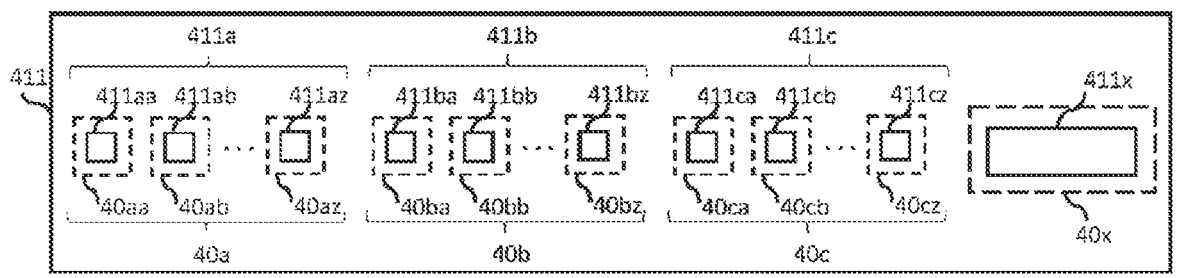
FIG. 2 is an example of network packets.

FIG. 2 is a diagram illustrating an example of network packets 411. The network packets 411 is formed with a single communication packet. Here, it is assumed, as an example, that the network packets 411 uses, as communication protocols, an Ethernet (registered trademark) protocol for a network access layer in the TCP/IP model, an internet protocol (IP) for an Internet layer, and a transmission control protocol (TCP) for a transport layer. Protocol specifications for the Ethernet protocol, IP protocol, and TCP protocol have been published and are thus known protocols. In the present embodiment, a protocol other than these protocols may be used.

Furthermore, it is assumed that the network packets 411 is data in a communication that an unknown protocol whose protocol specifications are unknown is used for the application layer.

An example of network packets 411 illustrated in FIG. 2 includes protocol field groups 40a, 40b, and 40c formed with known protocols, and protocol field group 40x formed with unknown protocols.

The protocol field group 40a is an Ethernet header. The protocol field group 40b is an IP header. The protocol field group 40c is a TCP header. The protocol field group 40x is a protocol field group of an unknown protocols whose protocol specifications are unknown. It is assumed that the delimiter and semantics of the protocol fields in the protocol field group 40x are unknown.

In addition, each of the protocol field groups 40a, 40b, 40c, and 40x stores a parameter group, individually. The protocol field group 40a stores a parameter group 411a. Similarly, the protocol field groups 40b, 40c, and 40x stores parameter groups 411b, 411c, and 411x, respectively.

The protocol field group 40a includes a plurality of known protocol fields 40aa to 40az. The parameter group 411a includes a plurality of parameters 411aa to 411az. The protocol fields 40aa to 40az stores parameters 411aa to 411az, respectively.

Similarly, the protocol field group 40b includes a plurality of known protocol fields 40be to 40bz. Similarly, the protocol field group 40c includes a plurality of known protocol fields 40ca to 40cz. The parameter group 411b in FIG. 2 includes a plurality of parameters 411ba to 411bz. The parameter group 411c includes a plurality of parameters 411ca to 411cz.

In FIG. 1, the network packet capture unit 101 captures network packets 400. The network packet capture unit 101 captures the network packets 400 in real time from an external transmitter or the like. Note that the network packets 400 stored in advance as a file in an internal storage device or the like may be read out and captured.

Figure 3:
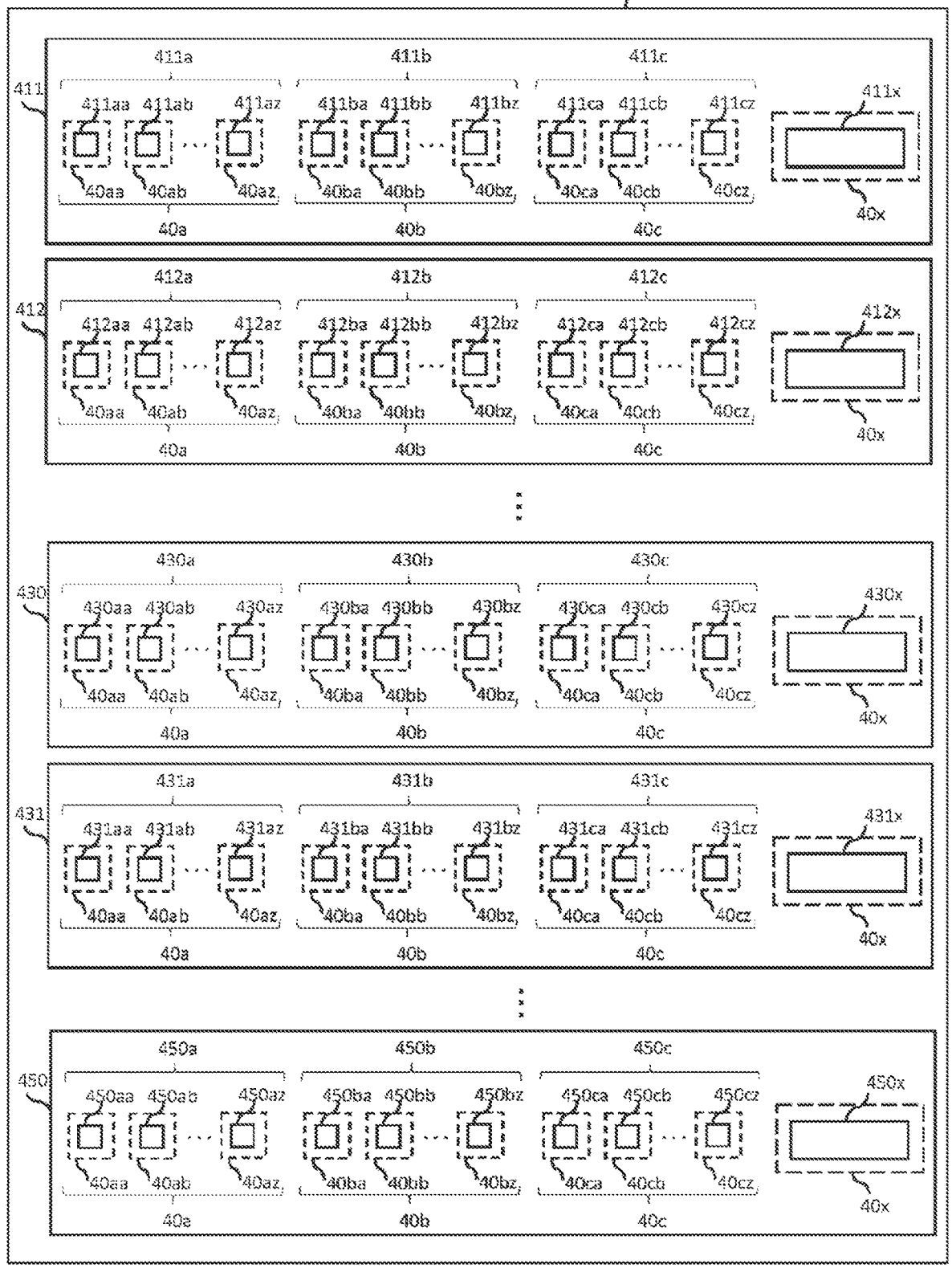
FIG. 3 is an example of a network packets.

As illustrated in FIG. 3, the network packets 400 includes a plurality of network packets 411 to 450 as an example. Each of the network packets 411 to 450 is a communication packet and each includes the protocol field groups 40a, 40b, 40c and 40x.

It is assumed that the network packets 411 to 450 constituting the network packets 400 are in a time series order from the network packets 411. That is, the data are arranged in a time series order in order from the smallest code of the network packets. Here, the time series order refers to an order in time series in which the network packets 411 to 450 are captured when the network packet analyzer 10 captures the network packets 411 to 450 in real time from an external transmitter or the like.

Furthermore, in a case where the network packet analyzer 10 reads out the network packets 400 from an internal storage device or the like, which stores the network packets 400 in advance, the time series order indicates a time series order when the network packets is stored in the storage device.

The network packet analyzer 10 is able to identify each of the network packets 411 to 450 constituting the network packets 400, and able to arrange them in time series order. Furthermore, although not illustrated in FIG. 3, the network packets 411 to 450 may include information indicating a time stamp (specific date and time of reception or storage).

Even when the network packets 411 to 450 include no information indicating a time stamp, the network packet analyzer 10 can arrange the network packets 411 to 450 in time series in the order of arrival. Still, when the network packets 400 includes information indicating a time stamp, the pattern generator 104 described below can utilize the communication frequency or periodicity of the network packets as one of patterns.

The protocol field group 40a individually stores the parameter group 411a, a parameter group 412a to a parameter group 450a. The protocol field group 40b individually stores the parameter group 411b, a parameter group 412b to a parameter group 450b. The protocol field group 40c individually stores the parameter group 411c, a parameter group 412c to a parameter group 450c. The protocol field group 40x individually stores the parameter group 411x, a parameter group 412x to a parameter group 450x.

The network packets filtering unit 102 extracts a network packets 400X from among the network packets included in the network packets 400 captured from the network packet capture unit 101 on a filtering condition that they have the same characteristic. The method for determining the same characteristic as the filtering condition will be described below.

In FIG. 3, it is assumed, for example, that the network packets 411 to 430 have a same destination MAC address A, while the network packets 431 to 450 have a same destination MAC address B.

Figure 4:
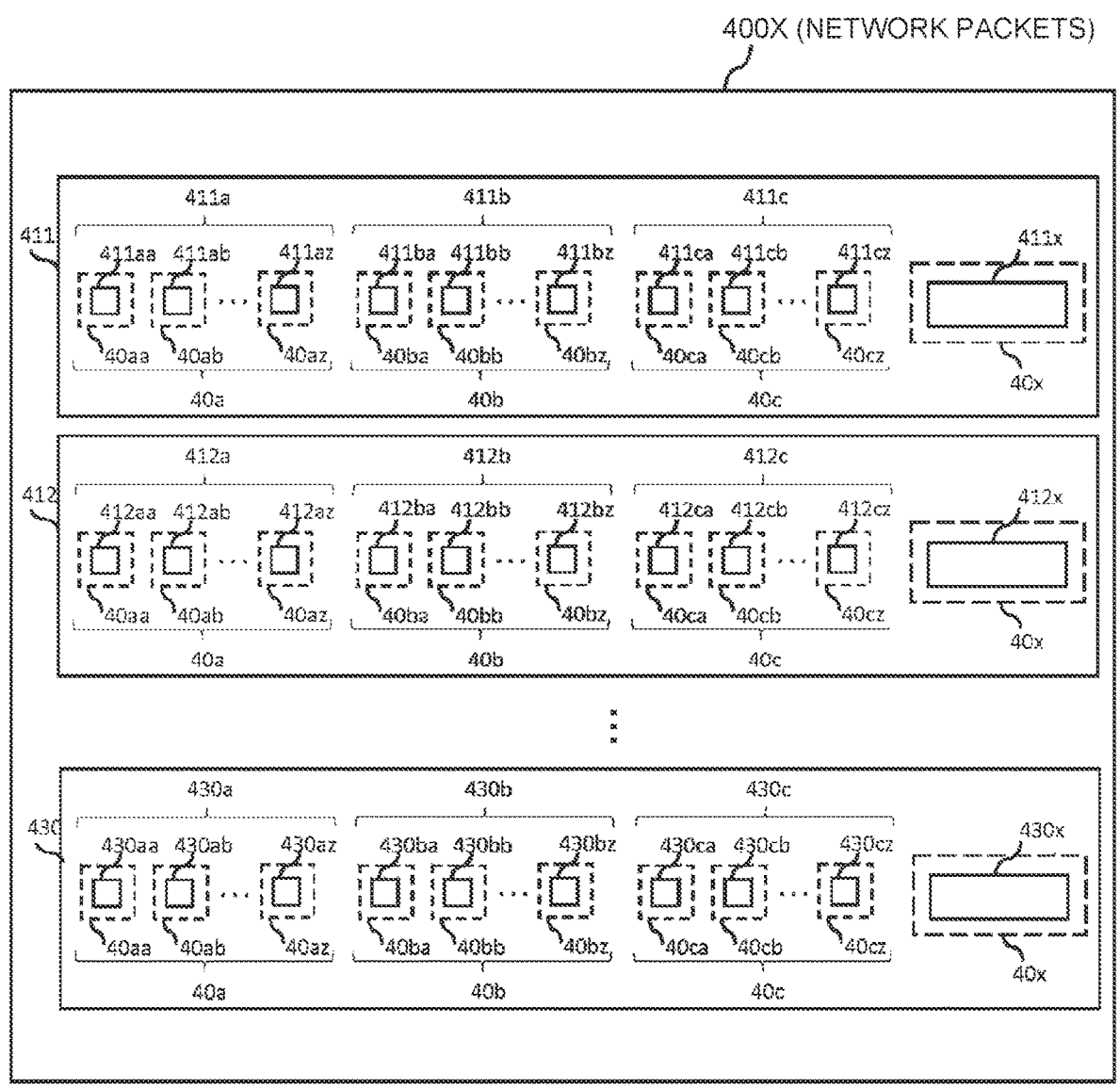
FIG. 4 is an example of a network packets.

FIG. 4 is a diagram of the network packets 400X extracted by the network packet filtering unit 102. In FIG. 4, it is assumed that network packets 411 to 430 are extracted from the network packets 400 of FIG. 3, as a network packets 400X having the same characteristic (on the filtering condition that the MAC address is the same and having the destination is A).

The network packet filtering unit 102 may store known protocol specifications such as the Ethernet protocol and the IP protocol, and may use the specifications to extract the network packets 400X. By using the network packets 400 as known protocol specifications, the network packet filtering unit 102 can use the parameters in the known protocol fields as the characteristic used for filtering the network packets having the same characteristic.

By using high-reliability characteristic such as known protocol fields when filtering the target network packets, it is possible to improve the accuracy of filtering the target network packets, leading to ultimate improvement of the estimation result for the semantics of the protocol field.

The filtering conditions regarding the extraction performed by the network packet filtering unit 102 is automatically determined by the network packet filtering unit 102 based on an algorithm.

The determination procedure performed by the network packet filtering unit 102 based on an algorithm starts first by creating a list of parameters of the network packets 400 for each of known protocol fields based on known protocol specifications. Subsequently the parameters possessed in common by the network packets containing the protocol field to be estimated are analyzed and determined.

The analysis of common parameters can use a decision tree, a probability model, a support vector machine (SVM), or the like, each being a type of machine learning method. However, there is no limitation to these and it is possible to use any algorithm.

As an example, it is assumed that, when network packets including a protocol field to be estimated is included only in a communication from a device A to a device B, the following condition is acquired: communication including a protocol field to be estimated by using an arbitrary algorithm is performed with a condition that "Source MAC address is MAC address of Device A" and "Destination MAC address is MAC address of Device B".

In this case, the condition obtained as a result of the algorithm is determined as an filtering condition to be used by the network packet filtering unit 102. Note that when there is a plurality of algorithm results and a priority or the like has been obtained, a condition having a higher priority may be determined as an filtering condition.

The filtering conditions of the network packet filtering unit 102 determined by the above-described method include parameters in known protocol fields, such as a data length, a MAC address, a IP address, a Ethernet frame type number, an IP protocol number, a port number, a frequency of communication, a time stamp, or the like.

When the MAC address and IP address are the same, network packets with the same communication direction can be extracted. Furthermore, when the destination port numbers are the same, it is possible to increase the possibility that the network packets of the same protocol can be extracted when the protocol is based on TCP/UDP. In addition, in the communication for the same purpose that performs transmission and reception periodically is likely to use a same protocol. When the frequency of communication is the same, it is highly possible that the communications use the same protocol and protocol field. Furthermore, when the network packets lengths are the same, it is possible to facilitate extraction of the communication of the same purpose when the protocol format is a fixed length.

The network packet filtering unit 102 outputs the network packets 400X to the variable field extraction unit 103.

The variable field extraction unit 103 captures the network packets 400X from the network packet filtering unit 102, and divides a protocol field group 40x of an unknown protocol from the hear so that the size of the parameter stored in one subfield becomes a fixed size. That is, each of the parameter group 411x to the parameter group 430x is to be divided from the head with a fixed size and stored in each of subfields. Subfields are candidates for protocol fields.

In the present embodiment, the unit of division is described as being divided into units of one octet, but the unit of division is not limited to this.

Figure 5:
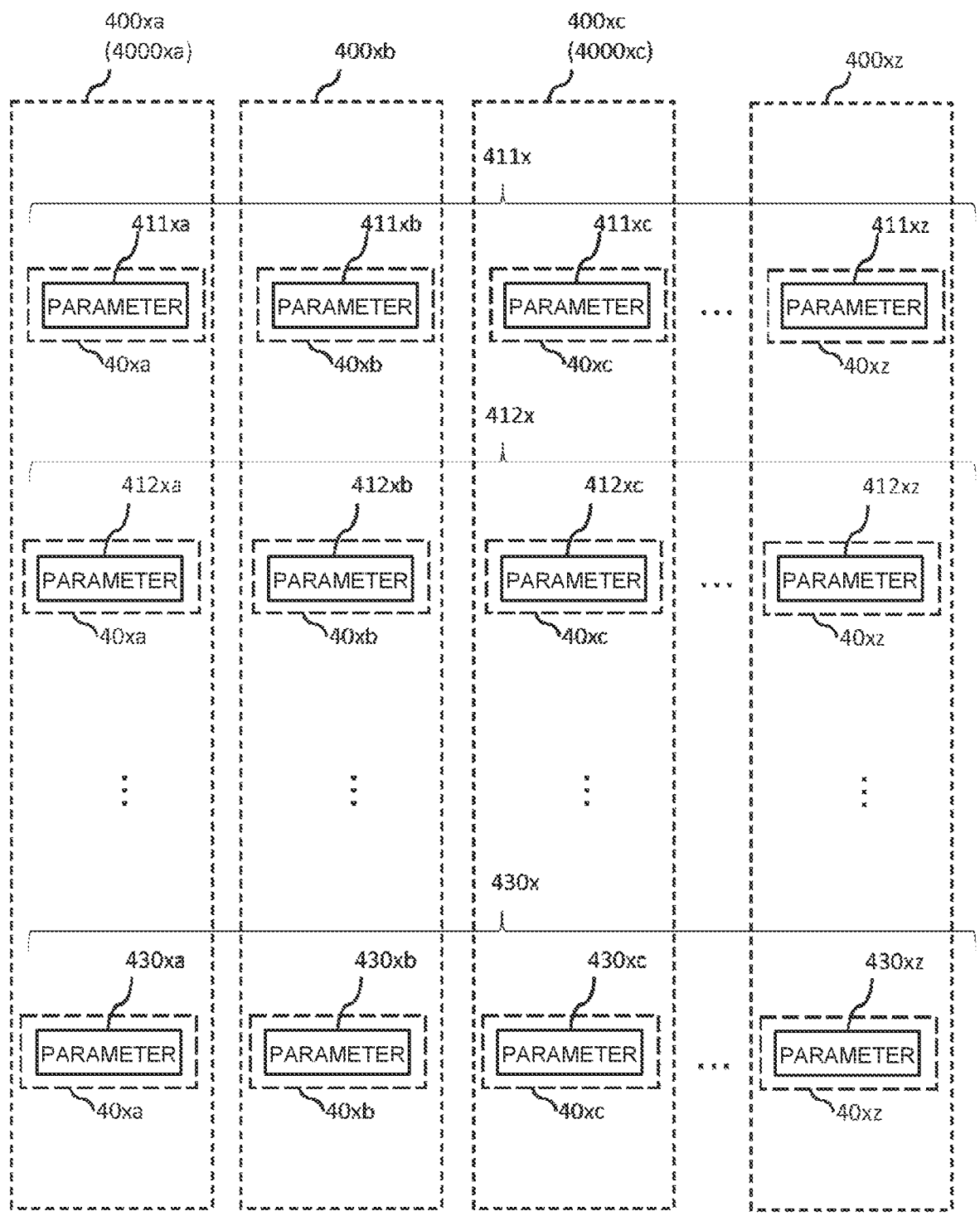
FIG. 5 is an example of division of a protocol field group.

FIG. 5 illustrates an example in which the protocol field group 40x of unknown protocols among the network packets 400X is divided into a subfield 40xa, a subfield 40xb, and a subfield 40xc to a subfield 40xz, each being formed with octet. Therefore, the parameter group 411x is divided into parameters 411xa, 411xb, 411xc to 411xz, one octet for each. Similarly, the protocol field group 40x storing the parameter group 412x to the parameter group 430x is also divided into subfield 40xa, subfield 40xb, and subfield 40xc to subfield 40xz, by octet for each. The network packet analyzer 10 estimates the semantics of the subfield, regarding the subfield as a protocol field.

A sequence of a plurality of parameters belonging to a same subfield, arranged in time series order, is defined as a parameter sequence. That is, in the extracted network packets 400x, the parameters existing at the same position in the layer to be analyzed (for example, the application layer) in mutually different pieces of network packets 411, 412 to 430 are assumed to belong to the same parameter sequence.

In the present specification, a subfield storing parameters constituting a certain parameter sequence are simply referred to as a "subfield corresponding to a parameter sequence" or a "subfield of a parameter sequence" in some cases.

In addition, a parameter sequence including parameters stored in a certain subfield is simply referred to as a "parameter sequence corresponding to a subfield" or a "parameter sequence of a subfield" in some cases.

As illustrated in FIG. 5, the parameter sequence 400xa includes a parameter 411xa, a parameter 412xa to a parameter 430xa, and these parameters are stored in the subfield 40xa, which is the first subfield.

The parameter sequence 400xb includes parameters 411xb, parameters 412xb to parameters 430xb, and these parameters are stored in the subfield 40xb, which is the second subfield.

The parameter sequence 400xc includes parameters 411xc, parameters 412xc to parameters 430xc, and these parameters are stored in the subfield 40xc, which is the third subfield.

The parameter sequence 400xz includes a parameter 411xz, a parameter 412xz to a parameter 430xz, and these parameters are stored in the subfield 40xz, which is the Nth subfield.

In a case where there is at least one parameter with a different value in a parameter sequence stored in a section divided by the variable field extraction unit 103, that is, in the same subfield, the parameters constituting the parameter sequence are variable in time series. This parameter sequence is defined as a variable field.

That is, the parameters that make up the variable field will have one or more different values. In contrast, when all the parameters of the parameter sequence stored in the same subfield are the same, the parameter sequence is regarded as an invariant portion.

In the present specification, a subfield that stores parameters constituting a certain variable field is simply referred to as a "subfield corresponding to a variable field" or a "subfield of a variable field" in some cases.

In addition, the variable field including the parameters stored in a certain subfield is simply referred to as a "variable field corresponding to a subfield" or a "variable field of a subfield" in some cases.

The variable field extraction unit 103 extracts a variable field from the parameter sequence described above. The variable field extraction unit 103 compares a plurality of parameters with each other for each of parameter sequences. In a case where the parameters are not all the same and have at least one different value, the variable field extraction unit 103 determines the parameter sequence as a variable field. In the present embodiment, the variable field extraction unit 103 would not perform extraction when the parameter sequence is an invariant portion.

For example, in a case where a plurality of parameters (parameters 411xa, 412xa to parameter 430xa) constituting the parameter sequence 400xa are not all the same and have different values, the variable field extraction unit 103 extracts the parameter sequence 400xa of the first subfield, as a variable field 4000xa.

For example, in a case where a plurality of parameters (parameters 411xb, 412xb to parameter 430xb) constituting the parameter sequence 400xb are all the same, the variable field extraction unit 103 would not extract the parameter sequence 400xb of the second subfield.

For example, when a plurality of parameters (parameters 411xc, 412xc to parameter 430xc) constituting the parameter sequence 400xc are not all the same and have different values, the variable field extraction unit 103 extracts the parameter sequence 400xc of the third subfield, as a variable field 4000xc.

For example, when a plurality of parameters (parameters 411xz, 412xz to parameter 430xz) constituting the parameter sequence 400xz are all the same, the variable field extraction unit 103 would not extract the parameter sequence 400xz of the Nth subfield.

The variable field extraction unit 103 outputs variable field information and the network packets 400X to the pattern generator 104. Here, the variable field information is information indicating an identifier (for example, the variable field 4000xa) of each of variable fields extracted by the variable field extraction unit 103 and a subfield corresponding to each of the variable fields (for example, the first subfield).

The pattern generator 104 acquires the variable field information and the network packets 400X from the variable field extraction unit 103.

As described above, the variable field information indicates an identifier of each of variable fields and a subfield corresponding to each of the variable fields. By indicating the order of the subfield corresponding to the variable field within the subfields, it is possible to specify the position of the variable field within the network packets 400X. Therefore, based on the variable field information and the network packets 400X, the pattern generator 104 can specify the parameters included in each of the variable fields and the time series order of the parameters for each of the variable fields extracted by the variable field extraction unit 103.

The parameters included in the variable field has a change in time series. In the present specification, a pattern that expresses the characteristic of how the parameters included in the variable field change in time series, is defined as a pattern.

The pattern can be generated in plurality of types by expressing the characteristic of how the parameters change in time series in various perspectives. The types of patterns include, for example, a pattern expressing the regularity of parameters in a time series as a pattern (hereinafter referred to as pattern type 1) and a pattern expressing the type of parameter as a pattern (hereinafter, pattern type 2).

In the present specification, "generating a pattern corresponding to each of types of the pattern" is referred to as "generating a pattern".

The pattern generator 104 generates a pattern for each of types of patterns based on the parameters and the time series order of the parameters for each of variable fields extracted by the variable field extraction unit 103, and then generates pattern data 500 associating the variable field (indicating an identifier and the order of the subfield) with the pattern.

The pattern type 1 is a pattern expressed as a pattern by focusing on the "regularity of parameter change" as a characteristic. The pattern can be expressed by a numerical value, a waveform, a mathematical formula, or the like. For example, the pattern can be expressed by using an outline of a graph in which the horizontal axis is a time series and the vertical axis is a parameter, as a pattern. Examples of the outline shape (pattern) of the waveform include "triangular wave", "rectangular wave", and "trapezoidal wave". In case where the pattern does not correspond to any of these, it will be indicated by "N/A".

A method of creating the pattern of the pattern type 1 by the pattern generator 104 will be described. First, the pattern generator 104 plots each of parameters with the horizontal axis as the time series and the vertical axis as the parameter based on the parameters and the time series order of the parameters included in the variable field, and then connects the adjacent plots with a line to create an outline of the graph. Next, the pattern generator 104 determines an outline of the graph having the highest similarity measure among the outlines of graphs such as "triangular wave", "rectangular wave", and "trapezoidal wave", which are set in advance as the pattern of type 1, as a pattern of type 1 for the variable field. It is possible to use any method as long as it is capable of judging whether the outline of the graph created having parameters in the vertical axis and having the time series in the horizontal axis matches the outline of a preliminarily set graph. For example, it is conceivable to use a method of expressing a change in a numerical value by a mathematical formula or a method of expressing the change by a combination of increase/decrease (increase, no increase and decrease, or decrease) of numerical values.

The pattern type 2 is a type of pattern that focuses on the "type of parameter" as a characteristic and focuses on the number of different parameters for the parameters included in the variable field. Regarding the pattern, it is possible to use "two" parameters when the parameter (specifically, 00, etc.) included in the variable field has only two values (for example, 0x00 and 0x01), or use "(upper limit value–lower limit value+1)" parameters obtained by adding 1 to a difference between an upper limit value and a lower limit value of the parameters included in the variable field, to express the patterns.

In a case where a valid pattern cannot be found when generating each of patterns (for example, the pattern does not match any waveform in pattern type 1), it is possible to express as "N/A" so as to be utilized at the time of semantic estimation by the semantic estimation unit 106, described below.

A method of creating the pattern of the pattern type 2 by the pattern generator 104 will be described.

The pattern generator 104 first calculates the number of different parameters among the parameters included in the variable field. For example, when the parameter included in the variable field has only two values, the number of pattern type 2 is determined as "2". Furthermore, the pattern generator 104 calculates the maximum number of different parameters among the parameters included in the variable field. For example, when the parameter included in the variable field can take a large number of values between the lower limit value and the upper limit value, the maximum number in the pattern type 2 can be determined as "(upper limit value−lower limit value+1)".

Regarding the matching of the pattern "(upper limit value−lower limit value+1)", it is only required that the pattern generator 104 acquires the upper limit value and the lower limit value of the parameters included in the variable field, and assigns the values to "(upper limit value−lower limit value+1)" and judges whether this value matches the number of different parameters of the variable field.

Figure 6:
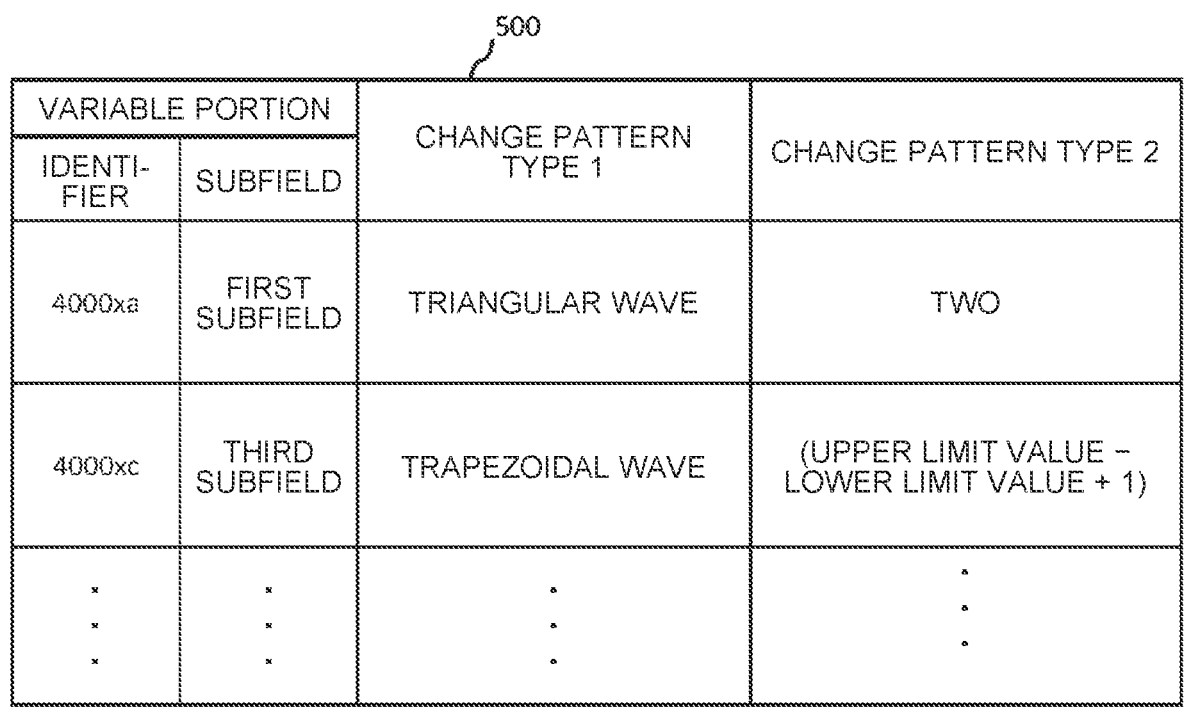
FIG. 6 is an example of pattern data.

FIG. 6 is an example of pattern data 500 created with the above procedure. In FIG. 6, each of the variable fields (identifier and subfield of each of variable fields) is associated with each of pattern types.

As an example, it is assumed that the parameters included in the variable field 4000xa are only "0x00" and "0x01". In addition, regarding the parameters included in the variable field 4000xa, it is assumed that by alternately repeating the values of "0x00" and "0x01" in time series, it would be possible to approximate, using a triangular wave, an outline of a graph generated by connecting, with a line, adjacent plots obtained as a result of plotting each of parameters included in the variable field 4000xa, with the horizontal axis as the time series and the vertical axis as the parameters. In this case, using the pattern generation method described above, the pattern generator 104 determines a "triangular wave" as the pattern of the pattern type 1 for the variable field 4000xa, and determines "2" pieces for the pattern of the pattern type 2.

As an example, when the parameter included in the variable field 4000xc rises from a lower limit value (0x12) by "0x01" and reaches an upper limit value (0x1E), and then, the upper limit value is continued for a while. Thereafter, the parameter falls from the upper limit value by "0x01" and reaches a lower limit value (0x12). The lower limit continues for a while, and then the parameter rises by "0x01" again, and this pattern will be repeated. In this case, when the horizontal axis is the time series and the vertical axis is the parameter, the parameters have varied so that the outline of the graph generated by connecting, with a line, adjacent plots obtained as a result of plotting each of parameters included in the variable field 4000xc shapes like a trapezoidal wave.

In this case, the pattern generator 104 determines the "trapezoidal wave" as the pattern of the pattern type 1 with respect to the variable field 4000xc. The number of different parameters is "13", and this value matches "upper limit value (0x1E)−lower limit value (0x12)+1=13". Therefore, the pattern generator 104 determines that the pattern of the type 2 of the variable field 4000xc is "(upper limit value−lower limit value+1)".

Note that the pattern generator 104 preferably generates a plurality of types of patterns for each of variable fields.

Here, the pattern generator 104 outputs the pattern data 500 including the patterns of types 1 and 2 to the semantic estimation unit 106.

The training data storage unit 105 preliminarily stores training data 600 in which the semantics of the protocol field and the pattern indicating the characteristics of the parameter variation in the protocol field are associated with each other.

FIG. 7 is a diagram illustrating an example of the training data 600. In FIG. 7, the semantics of the protocol field, the pattern being the pattern type 1, and the pattern being the pattern type 2 are associated with each other. In the first set, that the pattern of type 1 is "triangular wave" and the pattern of type 2 is "2" as the pattern associated with the semantics of "ON/OFF operation value" of the protocol field is shown. In the second set, that the pattern of type 1 is "trapezoidal wave" and the pattern of type 2 is "upper limit value−lower limit value+1" as the pattern associated with the semantics of "process variable" of the protocol field is shown.

It is allowable to use, as the training data 600, as an example, an analysis result of the protocol header information whose specifications are published, the pattern manually set by an operator, or the like, and the content of the training data 600 can be altered as appropriate.

The semantic estimation unit 106 acquires the pattern data 500 from the pattern generator 104, and acquires the training data 600 from the training data storage unit 105. The semantic estimation unit 106 estimates the semantics of each of variable fields included in the pattern data 500 by using the training data 600.

In the present specification, the semantics of the subfield corresponding to the variable field is referred to as "semantics of the variable field". The "semantics of the subfield" indicates what purpose the subfield is used for. The semantic estimation unit 106 regards one subfield as one protocol field and estimates the semantics of the subfield.

The semantic estimation unit 106 calculates similarity measures R11a and R11b of each type of pattern of the first variable field 4000xa with the pattern of the same type of the first set of the training data 600. Here, it is assumed that the larger the values of the similarity measures R11a and R11b, the more similar the values are to each other. The similar applies to each of the following similarity measures.

Specifically, the semantic estimation unit 106 calculates the similarity measure R11a between the pattern of type 1 of the first variable field 4000xa and the pattern of type 1 of the first set of the training data 600. The semantic estimation unit 106 also calculates the similarity measure R11b between the pattern of type 2 of the first variable field 4000xa and the pattern of type 2 of the first set of the training data 600.

Next, the semantic estimation unit 106 calculates a degree of total similarity R11 between the pattern of the first variable field 4000xa and the pattern of the first set of the training data 600. In the present embodiment, the degree of total similarity R11 is a sum of the similarity measure R11a and the similarity measure R11b, but is not limited thereto.

Next, the semantic estimation unit 106 similarly calculates the degree of total similarity R12 between the pattern associated with the first variable field 4000xa and the pattern of the second set of the training data 600. The semantic estimation unit 106 performs similar processing on the patterns of the remaining sets of the training data 600.

The semantic estimation unit 106 estimates the semantics of the protocol field associated with the pattern having the highest degree of total similarity value among the calculated degree of total similarities R11, R12, . . . , R1N, as the semantics of the first variable field 4000xa. As an example, when the value of R11 is the largest among the degree of total similarities, the semantics of the first set of the training data 600, that is, the "ON/OFF operation value" will be determined as the semantics of the variable field 4000xa.

The semantic estimation unit 106 similarly calculates the degree of total similarities R21, R22, . . . , R2N between the pattern associated with the second variable field 4000xc and the pattern of the training data 600.

As an example, when the value of R22 is the largest among the degree of total similarities, the semantics of the variable field 4000xc will be determined as the semantics of the second set of the training data 600, that is, the "process variable".

The semantic estimation unit 106 performs similar processing on the remaining variable fields included in the pattern data 500, and generates estimation result information 700 that associates individual variable fields (identifier and subfield of each of variable fields) with the estimated semantics.

Figure 8:
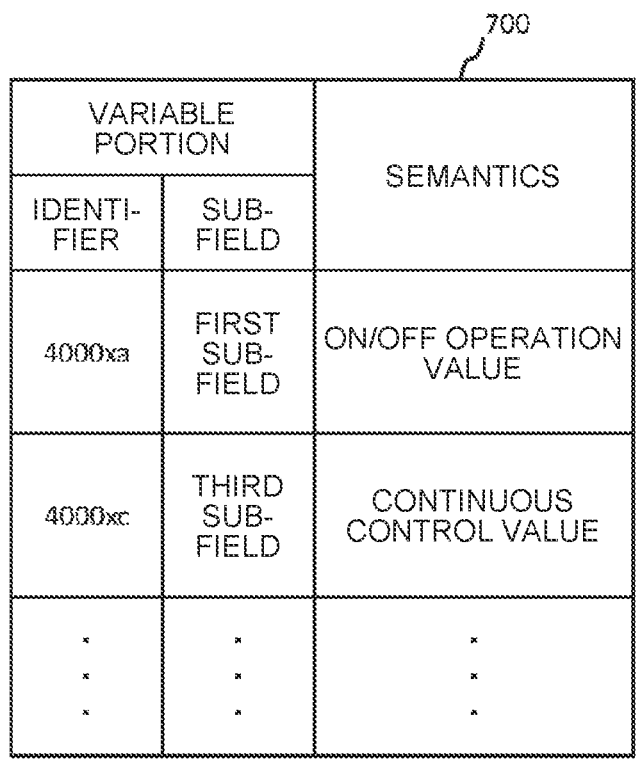
FIG. 8 is an example of estimation result information.

FIG. 8 is a diagram illustrating an example of the estimation result information 700. In FIG. 8, the first variable field 4000xa is associated with the "ON/OFF operation value", and the second variable field 4000xc is associated with the "process variable".

The semantic estimation unit 106 outputs the estimation result information 700 to the estimation result output unit 109.

The estimation result output unit 109 displays the estimation result information 700 on a display device 75 (FIG. 18) or the like, and notifies the operator.

Processing of First Embodiment

Figure 9:
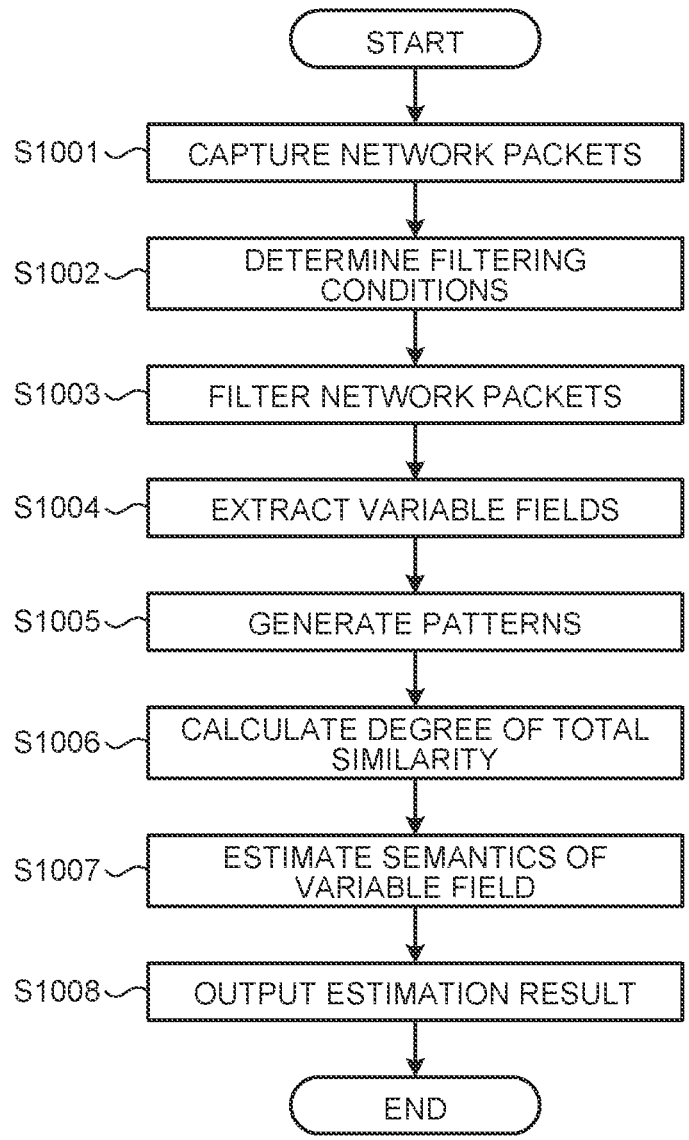
FIG. 9 is an example of a processing procedure of the network packet analyzer according to the first embodiment.

An example of the processing in the first embodiment will be described with reference to FIG. 9. FIG. 9 is a flowchart illustrating a processing procedure of the network packet analyzer 10 according to the first embodiment.

First, in step S1001, the network packet capture unit 101 captures the network packets 400 illustrated in FIG. 3 and outputs the network packets 400 to the network packet filtering unit 102.

The network packet filtering unit 102 captures the network packets 400 from the network packet capture unit 101, and determines filtering conditions for filtering a plurality of pieces of network packets to be analyzed from the network packets 400 (step S1002). Furthermore, using the determined filtering conditions, the network packet filtering unit 102 extracts a plurality of pieces of network packets to be analyzed from the network packets 400 as the network packets 400X (FIG. 4), and outputs the network packets 400X to the variable field extraction unit 103 (step S1003).

The variable field extraction unit 103 captures the network packets 400X. Subsequently, the variable field is extracted based on the network packets 400X, and the network packets corresponding to the variable field information including the identifier of the extracted variable field is output to the pattern generator 104 (step S1004). As an example, in a case where the variable field 4000xa and the variable field 4000xc illustrated in FIG. 5 have been extracted, the variable field information associated with the extracted variable field identifier and subfield, and network packets 400X, are output to the pattern generator 104.

In step S1005 of FIG. 9, the pattern generator 104 generates the pattern data 500 illustrated in FIG. 6 as an example based on the network packets 400X and the variable field information, and outputs the generated pattern data 500 to the semantic estimation unit 106.

In step S1006 of FIG. 9, the semantic estimation unit 106 acquires the pattern data 500 from the pattern generator 104, and acquires the training data 600 from the training data storage unit 105. Similarly, in step S1006, the semantic estimation unit 106 calculates, for each of variable fields, the degree of total similarity between the pattern associated with the variable field and the pattern associated with the semantics of each of the protocol fields included in the training data 600.

Among the degree of total similarity between the pattern associated with the variable field and the pattern associated with the semantics of each of the protocol fields included in the training data 600 for each of variable fields, the semantic estimation unit 106 determines the semantics of the protocol field associated with the pattern having the highest degree of total similarity to be the semantics of the variable field, and generates the estimation result information 700 (step S1007). Similarly, in step S1007, the semantic estimation unit 106 outputs the estimation result information 700 to the estimation result output unit 109.

The estimation result output unit 109 controls to display the estimation result information 700 on the display device 75 or the like (step S1008).

This completes the processes of the network packet analyzer 10.

Advantages of First Embodiment

The network packet analyzer 10 can calculate the degree of total similarity between the pattern associated with the variation portion and the pattern associated with the semantics of the protocol field, and can estimate the semantics of the variable field within the protocol field group of an unknown protocol based on the calculated degree of total similarity. That is, the network packet analyzer 10 can automatically estimate the semantics of the subfield corresponding to the variable field within the protocol field group of an unknown protocol without using the protocol specification of the unknown protocol.

The operator can recognize the semantics of the subfield corresponding to the variable field by viewing the estimation result information 700 output by the network packet analyzer 10.

Furthermore, it is possible to appropriately add the set of the semantics of the protocol field and the pattern included in the training data 600 stored in the training data storage unit 105 of the network packet analyzer 10, leading to high expandability.

By including a set of the semantics of the protocol field and the patterns that could not be estimated in the past technologies, in the training data 600 of the network packet analyzer 10, it is possible to automatically estimate the semantics of the protocol fields that could not be estimated in the past.

Furthermore, it is preferable that the pattern generated by the pattern generator 104 of the network packet analyzer 10 and the pattern included in the training data 600 stored in the training data storage unit 105 are of a plurality of types. When the semantic estimation unit 106 calculates the degree of total similarity of the pattern using a plurality of types of patterns, there are more types of patterns used for comparison, as compared with the case of calculating the degree of total similarity (in this case, the similarity measure and the degree of total similarity are the same) of the pattern using only one type of pattern. This makes it possible to improve the accuracy of the degree of total similarity of the patterns.

Furthermore, since the semantic estimation unit 106 perform estimating regarding the semantics of the protocol field having the highest degree of total similarity as the semantics of the variable field. Therefore, improvement of the calculation accuracy of the degree of total similarity leads to the improvement of the accuracy of the semantic estimation of the variable field.

Therefore, the pattern generator 104 generates a plurality of types of patterns, the training data storage unit 105 stores the plurality of types of patterns, and the semantic estimation unit 106 uses the plurality of types of patterns to make estimation of the semantics of the variable field, making it possible to improve the accuracy of estimating the semantics of the variable field.

With the above configuration, by utilizing the network packet analyzer 10 for penetration testing, fuzzing, intrusion detection system, or the like, it is possible to improve the security of a system using a protocol unique to the application.

Figure 10:
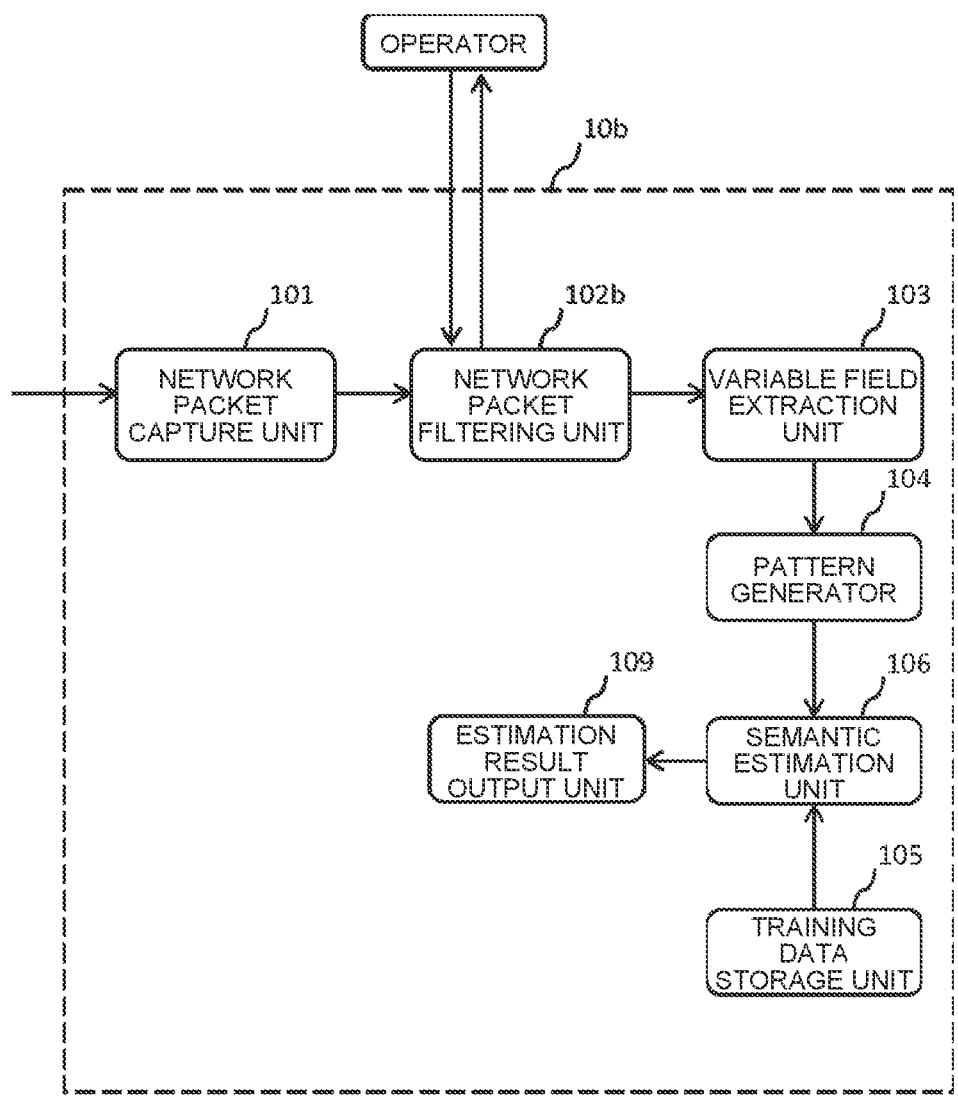
FIG. 10 is a functional block diagram of a network packet analyzer according to a first modification of the first embodiment.

First modification of first embodiment FIG. 10 is a functional block diagram of a network packet analyzer 10b according to a first modification of the first embodiment. This modified apparatus differs from the network packet analyzer 10 according to the first embodiment in that the network packet filtering unit 102 is replaced with a network packet filtering unit 102b.

The operator manually determines the method of determining the filtering conditions of the network packet filtering unit 102b according to the modification of the first embodiment.

The procedure to be manually determined by the operator is first started by displaying a list of parameters of the network packets 400 (individual parameters of the network packets 411 to 450) to the operator for each of protocol fields. The operator analyzes the parameter commonly possessed by the network packets including the protocol field to be estimated among the displayed parameters, and determines the parameter as filtering conditions.

As an example, in a case where the network packets including the protocol field to be estimated is included only in the communication from device A to device B, the operator determines the filtering conditions as "Source MAC address is MAC address of device A" and "Destination MAC address MAC is address of device B".

In the network packet analyzer 10b according to the first modification of the first embodiment, the operator can determine the filtering conditions of the network packet filtering unit 102.

Second Modification of First Embodiment

Examples of other types of patterns generated by the pattern generator 104 of FIG. 1 described in the first embodiment include, a pattern indicating parameter irregularities in a time series as a pattern, a pattern indicating parameter period as a pattern, a pattern indicating a frequency of the parameter as a pattern, a pattern indicating an upper limit value of the parameter as a pattern, a pattern indicating a lower limit value of the parameter as a pattern, a pattern indicating the correlation with the data length as a pattern, a pattern indicating the correlation with the pattern of other elements as a pattern, a pattern indicating a change range of the increase/decrease of the parameter as a pattern, the pattern indicating the increase/decrease value of the parameter as a pattern, and a pattern indicating the rate of change of the parameter as a pattern.

The pattern indicating the irregularity of the parameter in the time series as a pattern is a pattern indicating that the variations of the parameters in the time series are irregular. This pattern is commonly found in protocol fields with artificially determined parameters.

The pattern indicating the period of the parameter as a pattern is a pattern indicating that the variation of the parameter is periodic. The period may be indicated by the number of parameters until the same parameter is obtained, or may be indicated in units of time when the network packets 400X is accompanied by a time stamp. This pattern is often found in communications that monitor the state by making inquiries on a regular basis, such as polling communications.

The pattern indicating the frequency of the parameter as a pattern is a pattern indicating whether the same parameter is frequently taken in a time series, the number of times each of parameters appears in the network packets, or the like.

The pattern indicating the upper limit value of the parameter as a pattern is a pattern indicating the upper limit value of the parameter sequence.

The pattern indicating the lower limit value of the parameter as a pattern is a pattern indicating the lower limit value of the parameter sequence.

The pattern indicating the correlation with the data length as a pattern is a pattern indicating the correlation between the network packets length and the parameter or the correlation between the data length and the parameter of a certain protocol. Commonly found in protocol fields such as a datagram length field in the IP protocol.

The pattern that indicates the correlation with the pattern of other elements as a pattern is a pattern that indicates, as a pattern, whether there is a correlation with the time series change of a parameter of the other variable field or a parameter stored in a known protocol field. For example, it is considered that there is a correlation in a case where the parameter of the variable field that is the target of generation of the pattern data 500 has varied at a timing when the parameter of the other variable field changes in time series. In this case, the parameter of the variable field that is the target of the pattern generation is a parameter included in the same network packets as the parameter of the other variable field. This pattern is often observed in a case where the protocol field constituted with a high-order digit and a low-order digit is divided into two when expressed by a subfield, or in a relationship between the protocol field of the set temperature value and the protocol field of the process variable such as the measured value of the temperature sensor.

The pattern indicating the change range of increase/decrease as a pattern is a pattern indicating a maximum value and a minimum value of the magnitude of the increased value or the decreased value as a pattern, for the variation of the parameters constituting the variable field.

The pattern indicating the increase/decrease value of the parameter as a pattern is a pattern that indicates a certain unit of numerical values as a pattern in a case where there is a variation in units of certain numerical values for the variation of the parameters constituting the variable field, and is a pattern that indicates the irregularity as a pattern in a case where the parameter variation is irregular.

The pattern indicating the rate of change of the parameter as a pattern is a pattern indicating the degree of change of a parameter sequence (specifically, changes by 2 times, changes by 1/10, or the like).

Second Embodiment

Outline and Configuration of Second Embodiment

A second embodiment will be described with reference to FIGS. 11 to 13.

Figure 11:
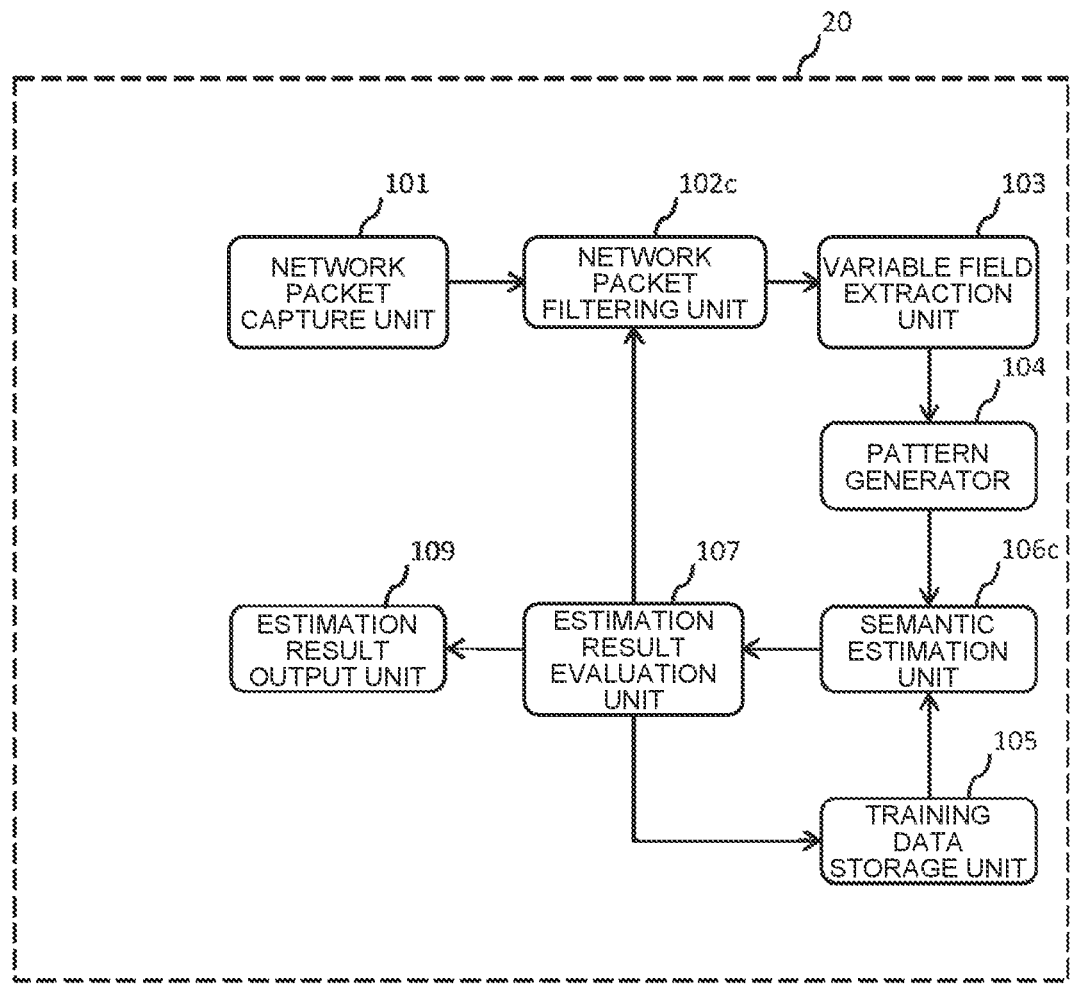
FIG. 11 is a functional block diagram of a network packet analyzer according to a second embodiment.

FIG. 11 is a functional block diagram of a network packet analyzer 20 according to the second embodiment. In the second embodiment, the components similar to those in the first embodiment are designated by the same reference numerals as in the first embodiment, and detailed description thereof will be omitted. As illustrated in FIG. 11, the network packet analyzer 20 includes a network packet capture unit 101, a network packet filtering unit 102c, a variable field extraction unit 103, a pattern generator 104, a training data storage unit 105, a semantic estimation unit 106c, an estimation result output unit 109, and an estimation result evaluation unit 107.

The network packet analyzer 20 differs from the network packet analyzer 10 according to the first embodiment in that it includes the network packet filtering unit 102c instead of the network packet filtering unit 102, and that it includes the semantic estimation unit 106c instead of the semantic estimation unit 106, and that it includes the estimation result evaluation unit 107 that evaluates the estimation result of the semantics of the variable field.

After estimating the semantics of the variable field, the network packet analyzer 20 evaluates the estimation result for each of variable fields and judges whether the semantic estimation is successful or unsuccessful. The network packet analyzer 20 has a function of updating the training data 600 in a case where it has evaluated that "estimation is successful" for at least one variable field.

Furthermore, in a case where the number of variable fields evaluated as successful in estimation is less than the preset number that has been preliminarily set, the network packet analyzer 20 performs extraction of network packets from the network packets 400 with unimplemented filtering condition, and performs semantic estimation using the extracted network packets.

In addition to the functions of the network packet filtering unit 102, the network packet filtering unit 102c includes an internal storage unit that stores filtering conditions determined for extraction from the network packets 400.

After acquiring an instruction information indicating an instruction to extract the network packets again from the estimation result evaluation unit 107, the network packet filtering unit 102c performs extraction of the network packets for the network packets 400 under an unimplemented filtering condition. At this time, the network packet filtering unit 102c refers to the filtering conditions at the time of the extraction performed so far for the network packets 400 using the internal storage unit, determines the filtering condition different from the filtering condition determined so far as the filtering condition, and then performs extraction.

The semantic estimation unit 106c estimates the semantics of the variable field similarly to the first embodiment. Furthermore, the semantic estimation unit 106c generates, for each of variable fields, estimation result information 700b including a variable field, semantics estimated as the semantics of the variable field, and a degree of total similarity with respect to the pattern associated with the semantics of the protocol field.

FIG. 12 is an example of the estimation result information 700b generated by the semantic estimation unit 106c. In FIG. 12, the first variable field 4000xa, "ON/OFF operation value" as its semantics, and a degree of total similarity R11 are associated with each other. Furthermore, the second variable field 4000xc, "process variable" as its semantics, and a degree of total similarity R22 are associated with each other.

The semantic estimation unit 106c outputs the estimation result information 700b and the pattern data 500 to the estimation result evaluation unit 107.

The estimation result evaluation unit 107 evaluates the estimation result based on the estimation result information 700b. The estimation result evaluation unit 107 acquires the estimation result information 700b and the pattern data 500 from the semantic estimation unit 106c. The estimation result evaluation unit 107 evaluates whether the estimation is successful or unsuccessful for each of variable fields of the estimation result information 700b.

The estimation result evaluation unit 107 performs evaluation using the degree of total similarity associated with each of variable fields of the estimation result information 700b. Furthermore, the estimation result evaluation unit 107 stores a preset threshold S1.

In a case where the degree of total similarity value associated with the variable field is higher than a threshold S1 for each of variable fields of the estimation result information 700b, the estimation result evaluation unit 107 evaluates that "estimation is successful". As an example, the degree of total similarity R11 associated with the first variable field 4000xa is compared with the threshold S1. In a case where R11 is greater than S1, the estimation result evaluation unit 107 evaluates that "estimation is successful" regarding the semantic estimation of the first variable field 4000xa.

Furthermore, in a case where the degree of total similarity value associated with the variable field is lower than the threshold S1 for each of variable fields of the estimation result information 700b, the estimation result evaluation unit 107 evaluates that "estimation is a failure".

As an example, the degree of total similarity R22 associated with the second variable field 4000xc is compared with the threshold S1. In a case where R22 is lower than S1, the estimation result evaluation unit 107 evaluates that "estimation is a failure" regarding the semantic estimation of the second variable field 4000xc.

The estimation result evaluation unit 107 has a function of updating the training data 600 in a case where it has evaluated that "estimation result is successful" for at least one variable field.

The estimation result evaluation unit 107 registers a set of the semantics of the variable field evaluated as "estimation is successful" and the pattern of the variable field (obtained from the pattern data 500), as the training data 600.

Note that in a case where a same set as the set of the semantics of the variable field judged to be "estimation is successful" and the pattern of the variable field has been already stored as the training data 600, the training data storage unit 105 would not need to newly store the set.

In addition, in a case where the number of variable fields evaluated as "estimation is successful" is less than a set number S2 that is preliminarily set and stored in the estimation result evaluation unit 107, the estimation result evaluation unit 107 outputs instruction information which is information indicating an instruction to extract the network packets again to the network packet filtering unit 102c.

In this case, each of functional units of the network packet analyzer 20 uses the network packets newly extracted by the network packet filtering unit 102c to estimate the semantics of the subfield in the protocol field of the unknown protocol to be analyzed.

Processing of Second Embodiment

An example of the processing in a second embodiment will be described with reference to FIG. 13. FIG. 13 is a flowchart illustrating a processing procedure of the network packet analyzer 20 according to the second embodiment.

The same steps as the processing steps of the network packet analyzer 10 according to the first embodiment are designated by the same reference numerals, and detailed description thereof will be omitted.

Figure 13:
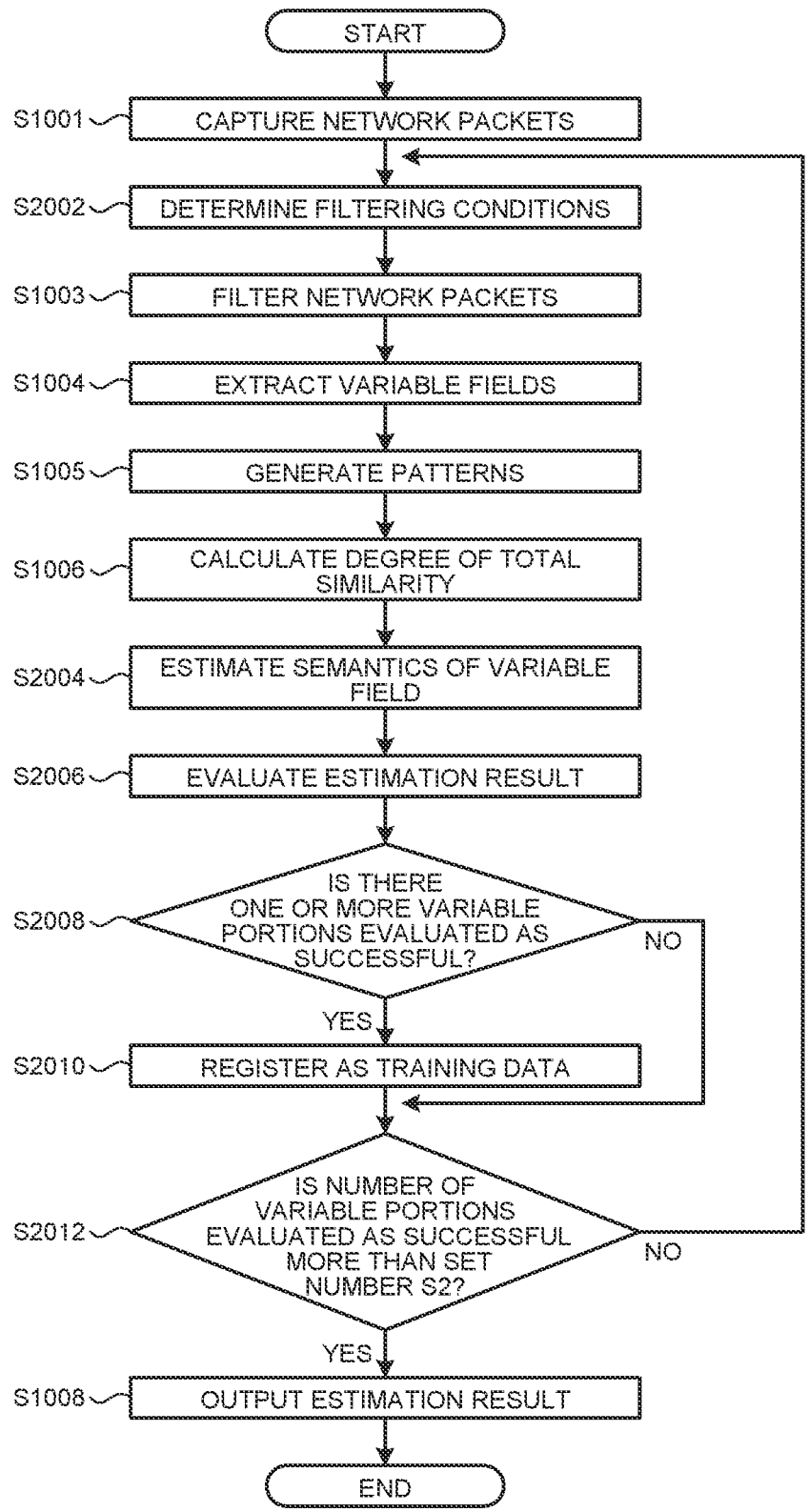
FIG. 13 is an example of a processing procedure of the network packet analyzer according to the second embodiment.

In step S2002 of FIG. 13, the network packet filtering unit 102c determines the filtering conditions for filtering the network packets from the network packets 400. At this time, the network packet filtering unit 102c extracts the network packets under new filtering conditions different from the filtering conditions used for filtering the network packets already executed for the network packets 400. When filtering the network packets for the first time for the network packets 400, there is no filtering condition for filtering the network packets that has already been executed. Accordingly, the filtering condition may be determined in the similar manner as in the first embodiment.

In FIG. 13, steps S1003 to S1006 are similar to those in the first embodiment.

In step S2004 of FIG. 13, the semantic estimation unit 106c estimates the semantics of each of variable fields and generates the estimation result information 700b. In the same step S2004, the semantic estimation unit 106c outputs the estimation result information 700b and the pattern data 500 to the estimation result evaluation unit 107.

In step S2006 of FIG. 13, the estimation result evaluation unit 107 acquires the estimation result information 700b and the pattern data 500 from the semantic estimation unit 106c, and further evaluates the estimation result of each of variable fields of the estimation result information 700b.

In step S2008, the estimation result evaluation unit 107 judges whether there is at least one variable field evaluated as "estimation is successful".

In a case where the estimation result evaluation unit 107 evaluates at least one variable field as "estimation result is successful" (step S2008: Yes), the estimation result evaluation unit 107 registers a set of the semantics of the variable field evaluated as "estimation is successful" and a pattern of the variable field (acquired from the pattern data 500) as the training data 600 (step S2010). Next, the process proceeds to step S2012.

In step S2008, in a case where there is no variable field evaluated as "estimation is successful" (step S2008: No), the estimation result evaluation unit 107 proceeds to step S2012.

In step S2012, the estimation result evaluation unit 107 judges whether the number of variable fields evaluated as "estimation is successful" is larger than the set number S2 preliminarily set and stored in the estimation result evaluation unit 107.

In step S2012, in a case where the number of variable fields evaluated as "estimation is successful" is larger than the set number S2 (step S2012: Yes), the estimation result evaluation unit 107 outputs the estimation result information 700b to the estimation result output unit 109, and proceeds to step S1008.

In step S2012, in a case where the number of variable fields evaluated as "estimation is successful" is less than the set number S2 (step S2012: No), the estimation result evaluation unit 107 outputs, to the network packet filtering unit 102c, instruction information, which is the information indicating an instruction to extract the network packets again, and proceeds to step S2002.

In step S1008 of FIG. 13, the estimation result output unit 109 controls to display the estimation result information 700b on the display device 75 (FIG. 18) or the like. This completes the processes of the network packet analyzer 20.

Advantages of Second Embodiment

In the network packet analyzer 20 according to the second embodiment, in addition to the advantage of the network packet analyzer 10 according to the first embodiment, the estimation result evaluation unit 107 evaluates the estimation result of the semantics of the variable field.

The estimation result evaluation unit 107 has a function of updating the training data 600 in a case where it has evaluated that "estimation result is successful" for at least one variable field.

This makes it possible to increase the number of semantics that can be estimated by the semantic estimation unit 106c. In addition, by increasing the patterns associated with the semantics of the protocol field, it is possible to improve the accuracy of estimation of the semantics.

Furthermore, in a case where the number of variable fields evaluated as "estimation is successful" is less than the preliminarily set number S2, the estimation result evaluation unit 107 outputs instruction information which is information indicating an instruction to extract the network packets again to the network packet filtering unit 102c, and the network packet filtering unit 102c extracts network packets with new filtering conditions. This makes it possible to improve the case where the initial filtering conditions are not appropriate and network packets having different parameter semantics has been included.

Modification of Second Embodiment

Figure 14:
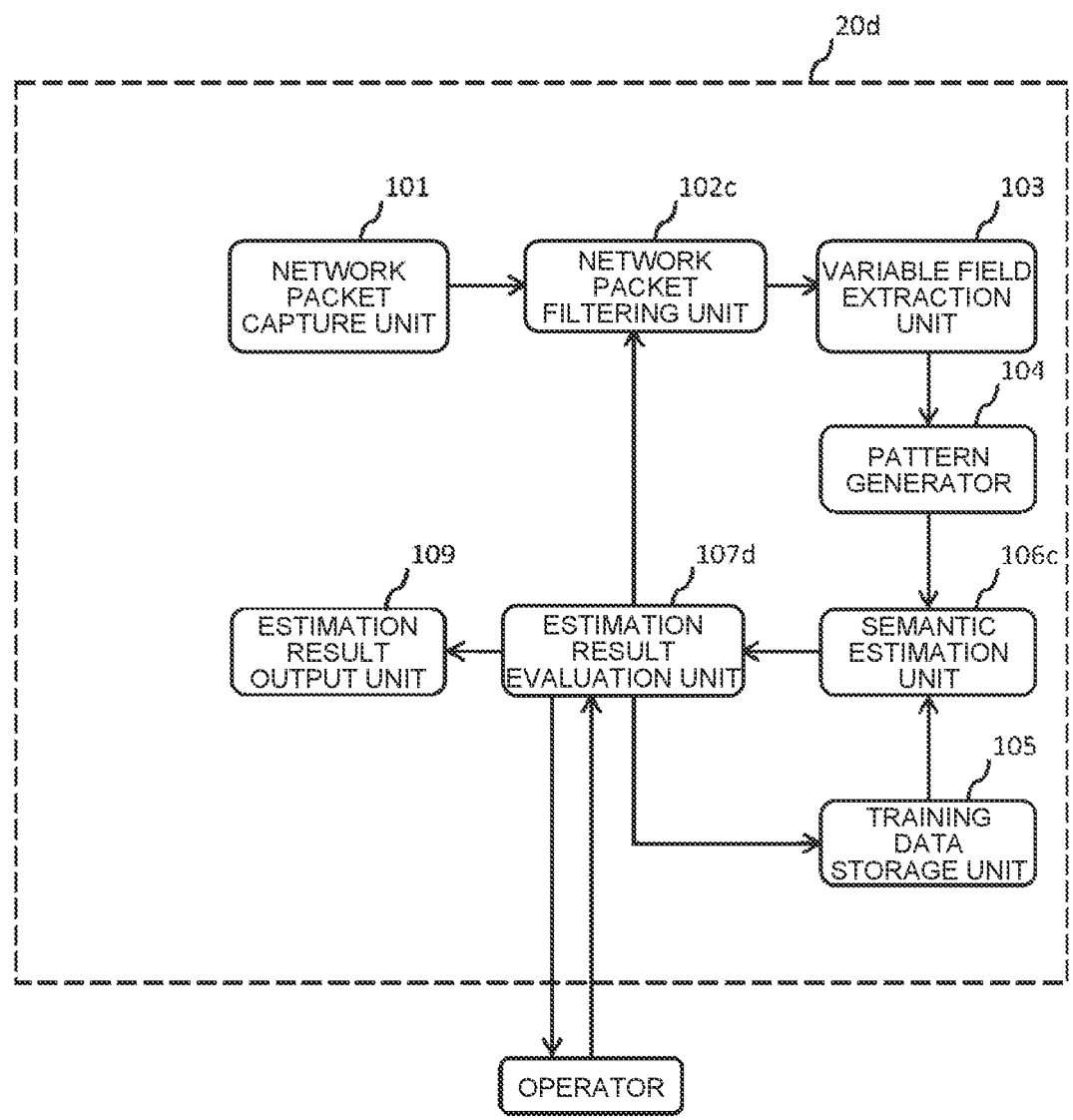
FIG. 14 is a functional block diagram of a network packet analyzer according to a modification of the second embodiment.

FIG. 14 is a functional block diagram of a network packet analyzer 20d according to a modification of the second embodiment.

The network packet analyzer 20d differs from the network packet analyzer 20 in that it includes an estimation result evaluation unit 107d instead of the estimation result evaluation unit 107. The estimation result evaluation unit 107d differs from the estimation result evaluation unit 107 in the estimation result evaluation method. The estimation result evaluation unit 107d acquires the estimation result information 700b from the semantic estimation unit 106c, and then controls to display the estimation result information 700b on the display device 75 (FIG. 18). Subsequently, the operator who browses the display device 75 evaluates whether the estimation result is successful, and an input apparatus 74 (FIG. 18) is used to input whether the estimation is successful for each of variable fields. The estimation result evaluation unit 107d acquires the evaluation of the estimation result from the operator and determines the evaluation as evaluation of the estimation.

Third Embodiment

Outline and Configuration of Third Embodiment

A third embodiment will be described with reference to FIGS. 15 to 17.

Figure 15:
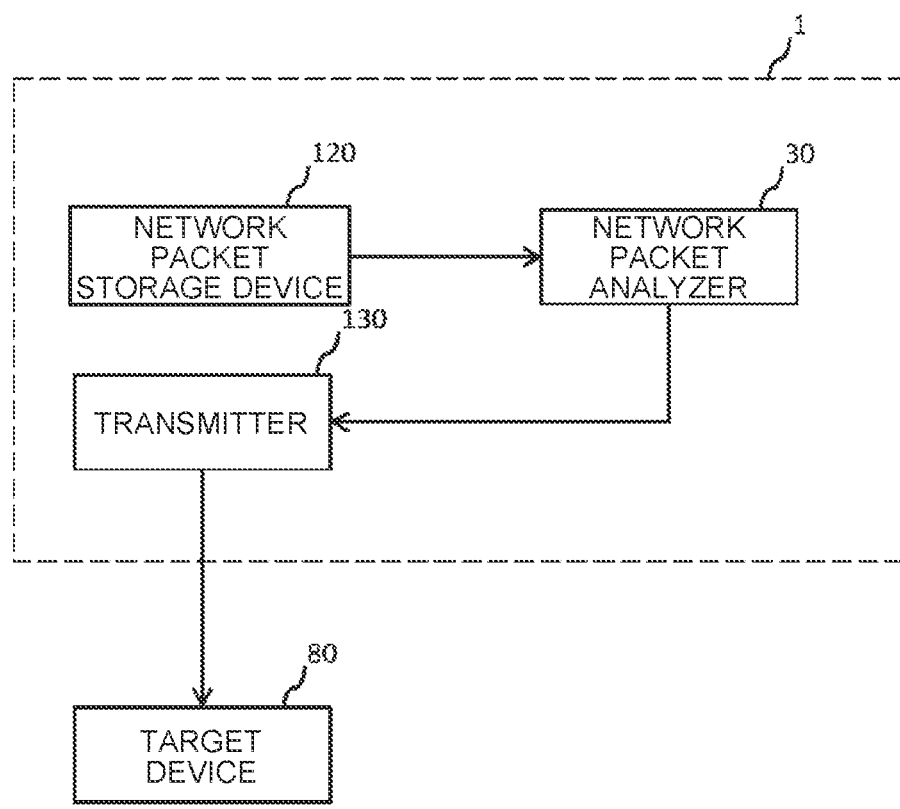
FIG. 15 is a schematic diagram of an inspection system according to a third embodiment.

FIG. 15 is a system configuration diagram of an inspection system 1 according to the third embodiment. In the third embodiment, the components similar to those in the first embodiment are designated by the same reference numerals as in the first embodiment, and detailed description thereof will be omitted. As illustrated in FIG. 15, the inspection system 1 includes a network packets storage device 120, a network packet analyzer 30, and a transmitter 130. The inspection system 1 prepares and executes a vulnerability inspection of a target device 80.

After generating the estimation result information 700, the network packet analyzer 30 has a function of specifying a subfield that stores a parameter that needs to be falsified by the transmitter 130, among the semantics included in the estimation result information 700, as a tampering target.

Therefore, the apparatus differs from the network packet analyzer 30 according to the first embodiment in that it newly includes a tampering target specifying unit 108, which will be described below, and that it includes a semantic estimation unit 106e instead of the semantic estimation unit 106.

The network packets storage device 120 stores a network packets. The network packet analyzer 30 captures the network packets 400 from the network packets storage device 120, and specifies a subfield (tampering target) for storing the parameter of the network packets to be falsified by the transmitter 130.

By falsifying the parameters stored in the specified subfield (tampering target) among the parameters of the network packets and further transmitting the falsified network packets to the target device 80, the transmitter 130 inspects the vulnerability of the target device 80. Specific inspection methods include fuzzing and penetration testing, for example.

FIG. 16 is a functional block diagram of individual devices included in the inspection system 1.

The network packets storage device 120 includes a network packets storage unit 121. The network packets storage unit 121 stores the network packets 400. The network packets 400 stored in the network packets storage unit 121 contains network packets to be falsified by the transmitter 130.

The network packet analyzer 30 includes a network packet capture unit 101, a network packet filtering unit 102, a variable field extraction unit 103, a pattern generator 104e, a training data storage unit 105, a semantic estimation unit 106e, and a tampering target specifying unit 108.

The network packet capture unit 101 captures the network packets 400 from the network packets storage unit 121 and outputs the network packets 400 to the network packet filtering unit 102. Since the functions of the network packet filtering unit 102, the variable field extraction unit 103, and the training data storage unit 105 are similar to those of the network packet analyzer 10 according to the first embodiment, the description thereof will be omitted.

After generating the pattern data 500, the pattern generator 104e outputs network packets 400X together with the pattern data 500 to the semantic estimation unit 106e.

After generating the estimation result information 700, the semantic estimation unit 106e outputs the estimation result information 700 and the network packets 400X to the tampering target specifying unit 108.

The tampering target specifying unit 108 acquires the estimation result information 700 and the network packets 400X from the semantic estimation unit 106e. The tampering target specifying unit 108 may have the semantics of the protocol field for storing the parameter that need to be falsified by the transmitter 130 preliminarily set and stored by the operator. The tampering target specifying unit 108 may specify the semantics based on an algorithm from the semantics of a known protocol field and the semantics of an estimated subfield.

Typically, in the execution of fuzzing and penetration testing, the semantics of the protocol field that stores the parameter that needs to be falsified includes two types: semantics that needs tampering of the parameter so that the target device that receives the falsified network packets would not discard the network packets; and semantics that needs tampering of the parameter in order to perform illegal operations on the target device.

Examples of the former, that is, semantics that needs tampering of the parameter so as not to discard the network packets include a time stamp, a data length, a checksum, a sequence number, and an adder (counter).

Examples of the latter, that is, the semantics that needs tampering of the value in order to perform illegal operations include an address, a data length, a set point (set temperature, etc.), a process variable (temperature sensor value, etc.), ON/OFF operation values, and state flags.

The tampering target specifying unit 108 specifies a protocol field and a subfield that store parameters to be falsified. It is also allowable to use a method of specifying a subfield having the same semantics as the protocol field storing the parameter which need to be falsified, in the semantics included in the estimation result information 700. Furthermore, the subfield extracted as the variable field by the variable field extraction unit 103 may be specified as a tampering target.

The tampering target specifying unit 108 transmits the tampering target specifying information indicating a location specified as a tampering target, and the network packets 400X, to a network packets tamper unit 131 of the transmitter 130.

The network packets tamper unit 131 acquires the tampering target specifying information and the network packets 400X from the tampering target specifying unit 108, and then generates a network packets (referred to as a network packets 400Y) obtained by falsifying the parameters of the tampering target included in the tampering target specifying information for the network packets included in the network packets 400X.

As a parameter tampering method, a known fuzzing or penetration testing technique may be used. The network packets tamper unit 131 transmits the network packets 400Y to a network packets transmission unit 132.

The network packets transmission unit 132 captures the network packets 400Y from the network packets tamper unit and transmits it to the target device.

Processing of Third Embodiment

An example of the processing in the third embodiment will be described with reference to FIG. 17. FIG. 17 is a flowchart illustrating a processing procedure of the network packet analyzer 30 according to the third embodiment.

Since steps S1001 to S1004 are similar to those in the first embodiment, detailed description thereof will be omitted.

In step S3001 of FIG. 17, the pattern generator 104e generates the pattern data 500, which is similar to step S1005 of FIG. 9. In step S3001, the pattern generator 104e outputs the network packets 400X to the semantic estimation unit 106e in addition to the pattern data 500. Step S1006 of FIG. 17 is similar to step S1006 of the first embodiment of FIG. 9.

In step S3002 of FIG. 17, the semantic estimation unit 106e estimates semantics of each variable field in the similar manner as in step S1007 of the first embodiment of FIG. 9. Furthermore, in step S3002, the semantic estimation unit 106e outputs the estimation result information 700 and the network packets 400X to the tampering target specifying unit 108.

The tampering target specifying unit 108 specifies a location having a semantics to be falsified from the semantics of known protocol fields and the semantics of estimated subfields (FIG. 17, step S3003). More specifically, it is allowable to use either the method of specifying a subfield having the same semantics as the protocol field that stores the parameter that needs to be falsified in the semantics included in the estimation result information 700, or the method of specifying the subfield extracted as a variable field by the variable field extraction unit 103, as the tampering target.

In the same step S3003, the tampering target specifying unit 108 transmits the tampering target specifying information indicating a location specified as a tampering target, and the network packets 400X, to the network packets tamper unit 131 of the transmitter 130. This completes the processes of the network packet analyzer 30.

Advantages of third embodiment The network packet analyzer 30 according to the third embodiment is newly equipped with the tampering target specifying unit 108, thereby enabling specifying the position of the field estimated to have the semantics that need tampering for the protocol fields and subfields in the network packets 400X.

With this process, the network packet analyzer 30 can generate network packets usable for fuzzing, penetration testing, or the like more efficiently and advantageously than using a brute force or dictionary attack to falsify each of parameters of the network packets included in the network packets 400X. In particular, with a capability of determining whether parameters should be falsified for each of subfields in the protocol field group 40*x* part of an unknown protocol, it is possible to narrow down tampering targets, leading to achievement of generation of network packets that usable for efficient and advantageous fuzzing and penetration testing.

Hardware Configuration

FIG. 18 is a hardware configuration diagram of the network packet analyzers 10, 10*b*, 20, 20*d*, and 30. As illustrated in FIG. 18, the network packet analyzer 10 includes a central processing unit (CPU) 71, read only memory (ROM) 72, random access memory (RAM) 73, an input apparatus 74, a display device 75, a storage device 76, a transmitter 77, and a bus 79 connecting individual portions, which has a hardware configuration using an ordinary computer.

In the network packet analyzers 10, 10*b*, 20, 20*d*, and 30 of the above embodiments and modifications, the CPU 71 loads a program from the ROM 72 onto the RAM 73 and executes the program, thereby implementing each of the above functions on a computer.

The CPU 71 is a hardware processor that loads a program stored in the ROM 72 and the storage device 76 onto the RAM 73, executes the program, and then processes (controls individual units, processes data, or the like) according to the program. The CPU 71 executes various processes in cooperation with a program stored in the ROM 72, the storage device 76, or the like, using a predetermined area of the RAM 73 as a work area.

The ROM 72 is memory that stores programs and various types of information in a non-rewritable manner. The ROM 72 stores a start program that loads an operating system boot program from the storage device 76 to the RAM 73.

The RAM 73 is memory such as synchronous dynamic access memory (SDRAM). The RAM 73 stores data to be processed by the CPU 71 or other data and functions as a work area of the CPU 71.

An input apparatus 74 is an input device such as a mouse and a keyboard. The input apparatus 74 receives the information input by an operation of the operator as an instruction signal and outputs the instruction signal to the CPU 71.

The display device 75 is a display device such as a liquid crystal display (LCD). The display device 75 displays various types of information based on a display signal from the CPU 71.

Examples of the storage device 76 include a hard disk drive (HDD) or a flash memory. The storage device 76 stores an operating system, programs, and data used by the functional units.

The transmitter 77 is an interface device for connecting to a network. The transmitter 77 communicates with an external device via a network under the control of the CPU 71.

The program executed by the network packet analyzer of the embodiments may be stored as a file in an installable format or an executable format, in a non-transitory computer-readable recording medium, such as a CD-ROM, a CD-R, a memory card, a digital versatile disk (DVD), or a flexible disk so as to be provided as a computer program product.

Moreover, the program executed by the information processing apparatus of the present embodiments may be stored on a computer connected to a network such as the Internet and provided by being downloaded via the network. Moreover, the program for executing the above-described processes may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A network packet analyzer comprising:
   a storage configured to store a plurality of sets of training data in which semantics of one protocol field and one or more first patterns for the one protocol field are associated with each other, the one protocol field being included in each of network packets to be received in time series, the one or more first patterns indicating different characteristics of variations of the parameters in parameter of the one protocol field among the network packets to be received in time series; and
   one or more hardware processors configured to:
      capture network packets in time series and extract variable fields whose parameters vary in time series among the captured network packets;
      generate one or more second patterns indicating different characteristics of variations in parameter of the variable fields among the captured network packets; and
      compare each of the one or more second patterns with each of the one or more first patterns of the training data and estimate semantics of the variable field.

2. The apparatus according to claim 1, wherein
the one or more second patterns two or more patterns, and
the one or more first patterns in the training data are two or more patterns.

3. The apparatus according to claim 1, the one or more hardware processors are configured to:
   divide an analysis target of the captured network packets into subfields; and
   filter, among one or more parameter sequences in which a plurality of the parameters stored in the same subfield are arranged in time series order, a parameter sequence in which the parameters constituting the parameter sequence have varied in time series, as the variable field.

4. The apparatus according to claim 1, wherein the one or more first patterns and the one or more second patterns each indicate at least one of characteristics including: a regularity of the parameter in time series; an irregularity of the parameter in time series; a type of the parameter; a period of the parameter; frequency of the parameter; an upper limit value of the parameter; a lower limit value of the parameter; a correlation between the parameter and a data length; a range of change in increase or decrease of the parameter; an increase or decrease value of the parameter; a rate of change of the parameter; and a correlation between the parameter and the parameter stored in the pattern of the other variable field or stored in a known field.

5. The apparatus according to claim 1, wherein the one or more hardware processors are configured to:
    calculate a similarity measure for each of patterns of a same type among the one or more second patterns of the variable field and the one or more first patterns of each of sets of the plurality of sets of training data;
    calculate a degree of total similarity for each of the sets based on the similarity measure; and
    estimate, as the semantics of the variable field, semantics of the protocol field of the set having the highest degree of total similarity.

6. The apparatus according to claim 1, wherein the one or more hardware processors are configured to:
    acquire a plurality of pieces of network packets; and
    filter, as the network packets among the plurality of pieces of network packets, two or more pieces of the network packets that satisfy a first filtering condition to have a same characteristic.

7. The apparatus according to claim 6, wherein the first filtering condition is a condition for one or more of a data length, a MAC address, an IP address, an Ethernet (registered trademark) frame type number, an IP protocol number, a port number, a communication frequency, and a time stamp.

8. The apparatus according to claim 5, wherein the one or more hardware processors are configured to:
    evaluate whether the estimation for the variable field is successful or unsuccessful based on the degree of total similarity; and,
    in response to evaluating that the estimation of at least one of the variable fields is successful, add, to the storage, information in which semantics of the variable field judged to be successful in estimation as the training data is associated with the second pattern of the variable field.

9. The apparatus according to claim 5, wherein the one or more hardware processors are configured to:
    acquire a plurality of pieces of network packets and extract, as the network packets among the plurality of pieces of network packets, two or more pieces of the network packets satisfying a first filtering condition to have a same characteristic;
    evaluate whether the estimation for the variable field is successful or unsuccessful based on the degree of total similarity; and,
    when a number of the variable fields judged to be successful in the estimation is less than a set number, extract the network packets under a second filtering condition being different from the first filtering condition.

10. The apparatus according to claim 1, wherein the one or more hardware processors are configured to specify the variable field as a tampering target.

11. The apparatus according to claim 1, wherein, when the semantics estimated as the semantics of the variable field is the same as predetermined semantics, the one or more hardware processors are configured to specify the variable field associated with the predetermined semantics as a tampering target.

12. A computer program product comprising a non-transitory computer-readable recording medium on which an executable program to be executed by a computer is recorded, the computer including a memory to store a plurality of sets of training data in which semantics of one protocol field and one or more first patterns for the one protocol field are associated with each other, the one protocol field being included in each of network packets to be received in time series, the one or more first patterns indicating different characteristics of variations in parameter of the one protocol field among the network packets to be received in time series, the executable program instructing the computer to:
    capture network packets in time series and extract variable fields whose parameters vary in time series among the captured network packets;
    generate one or more second patterns indicating different characteristics of variations in parameter of the variable fields among the captured network packets; and
    compare each of the one or more second patterns with each of the one or more first patterns of the training data and estimate semantics of the variable field.

* * * * *

UNITED STATES PATENT AND TRADEMARK OFFICE
CERTIFICATE OF CORRECTION

PATENT NO. : 11,909,747 B2
APPLICATION NO. : 17/185941
DATED : February 20, 2024
INVENTOR(S) : Satoshi Aoki et al.

Page 1 of 1

It is certified that error appears in the above-identified patent and that said Letters Patent is hereby corrected as shown below:

In the Claims

Claim 1, Column 22, Lines 43-44, "different characteristics of variations of the parameters in parameter" should read --different characteristics of variations in parameter--.

Claim 2, Column 22, Line 59, "the one or more second patterns two or more patterns" should read --the one or more second patterns are two or more patterns--.

Signed and Sealed this
Eighteenth Day of June, 2024

Katherine Kelly Vidal
*Director of the United States Patent and Trademark Office*